United States Patent
Eto et al.

(10) Patent No.: US 10,565,695 B2
(45) Date of Patent: Feb. 18, 2020

(54) APPARATUS AND METHOD FOR TRANSMITTING AND RECEIVING HIGH DYNAMIC RANGE IMAGES

(71) Applicant: Sony Corporation, Tokyo (JP)

(72) Inventors: Hiroaki Eto, Kanagawa (JP); Toshiya Hamada, Saitama (JP); Shinobu Hattori, Tokyo (JP); Kenichi Kanai, Tokyo (JP); Takumi Tsuru, Kanagawa (JP); Tomizo Shiraishi, Kanagawa (JP); Takehiro Nakatsue, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/913,226

(22) PCT Filed: Jun. 11, 2015

(86) PCT No.: PCT/JP2015/002945
§ 371 (c)(1),
(2) Date: Feb. 19, 2016

(87) PCT Pub. No.: WO2016/017058
PCT Pub. Date: Feb. 4, 2016

(65) Prior Publication Data
US 2016/0210730 A1    Jul. 21, 2016

(30) Foreign Application Priority Data

Jul. 28, 2014   (JP) .................................. 2014-153320
Sep. 9, 2014   (JP) .................................. 2014-182953

(51) Int. Cl.
*G06T 5/00*   (2006.01)
*G09G 5/02*   (2006.01)
(Continued)

(52) U.S. Cl.
CPC ............... *G06T 5/009* (2013.01); *G09G 5/02* (2013.01); *G06T 2207/20208* (2013.01); *G09G 2320/0276* (2013.01)

(58) Field of Classification Search
None
See application file for complete search history.

(56) References Cited

U.S. PATENT DOCUMENTS

2010/0283861 A1   11/2010   Tamagawa
2012/0147953 A1   6/2012   El-Mahdy et al.
(Continued)

FOREIGN PATENT DOCUMENTS

JP   2002132243 A   5/2002
JP   2010263437 A   11/2010
(Continued)

OTHER PUBLICATIONS

European Patent Office Communication pursuant to Article 94(3) EPC for Application No. EP15741606.6 dated Apr. 16, 2019, 7 pages.
(Continued)

*Primary Examiner* — Michael J Cobb
(74) *Attorney, Agent, or Firm* — Lerner, David, Littenberg, Krumholz & Mentlik, LLP

(57) ABSTRACT

An image processing apparatus and an image processing method to preferably transmit/receive or display high dynamic range images. In an image transmission system implementation, metadata is transmitted, the metadata storing information such as peak luminance, color gamut and optical-electro transfer or other characteristics of high dynamic range (HDR) content. An image receiving apparatus utilizes the metadata to perform dynamic range conversion using the metadata to adapt its display to display the HDR content.

10 Claims, 31 Drawing Sheets

(51) Int. Cl.
*H04N 19/46* (2014.01)
*H04N 19/98* (2014.01)
*H04N 5/235* (2006.01)

(56) References Cited

U.S. PATENT DOCUMENTS

| | | | | |
|---|---|---|---|---|
| 2012/0256943 | A1* | 10/2012 | Atkins | H04N 21/4854 345/590 |
| 2013/0038790 | A1 | 2/2013 | Seetzen et al. | |
| 2013/0076974 | A1* | 3/2013 | Atkins | H04N 5/235 348/362 |
| 2014/0044372 | A1 | 2/2014 | Mertens | |
| 2014/0210847 | A1* | 7/2014 | Knibbeler | G09G 5/006 345/589 |
| 2014/0247870 | A1 | 9/2014 | Mertens | |
| 2015/0010059 | A1 | 1/2015 | Hattori et al. | |
| 2016/0142714 | A1* | 5/2016 | Toma | H04N 21/4402 375/240.25 |
| 2016/0156965 | A1* | 6/2016 | Oh | H04N 19/46 725/116 |
| 2016/0189409 | A1* | 6/2016 | Aiba | G09G 5/14 345/629 |
| 2016/0254028 | A1* | 9/2016 | Atkins | H04N 5/147 386/241 |
| 2016/0292834 | A1* | 10/2016 | Tsuru | G06T 5/009 |
| 2017/0034520 | A1* | 2/2017 | Rosewarne | H04N 19/1887 |
| 2018/0048845 | A1* | 2/2018 | Kozuka | H04N 5/20 |

FOREIGN PATENT DOCUMENTS

| | | |
|---|---|---|
| JP | 2012519896 A | 8/2012 |
| JP | 2014-502480 A | 1/2014 |
| JP | 2014518024 A | 7/2014 |
| WO | 2011-106247 A2 | 9/2011 |
| WO | 2012-147018 A2 | 11/2012 |
| WO | 2012147022 A2 | 11/2012 |
| WO | 2013046095 A1 | 4/2013 |
| WO | 2014002901 A1 | 1/2014 |

OTHER PUBLICATIONS

Office Action for Application No. CN201580001640.7 dated Apr. 3, 2019.
International Search Report from International Application PCT/JP2015/002945 dated Sep. 1, 2015.
Notification of Reasons for Refusal of JP2014182953 dated Jul. 3, 2018.
Notification of Reasons for Refusal of JP2014182953 dated Feb. 20, 2018.
Mantiuk R et al: 11 Backward Compatible High Dynamic Range MPEG Video Compression, ACM Transactions on Graphics (TOG), ACM, US, Jul. 30, 2006 (Jul. 30, 2006). pp. 713-723, XP007902456, ISSN 0730-0301.

* cited by examiner

| knee_function_info(payloadSize){ | Descriptor |
|---|---|
| 601 — knee_function_id | ue(v) |
| 602 — knee_function_cancel_flag | u(1) |
| if(!knee_function_cancel_flag){ | |
| 603 — knee_function_persistence_flag | u(1) |
| 604 — mapping_flag | u(1) |
| 605 — input_d_range | u(32) |
| 606 — input_disp_luminance | u(32) |
| 607 — output_d_range | u(32) |
| 608 — output_disp_luminance | u(32) |
| 609 — num_knee_points_minus1 | ue(v) |
| 610 — for(i=0; i<=num_knee_points_minus1; i++){ | |
| 611 — input_knee_point[i] | u(10) |
| 612 — output_knee_point[i] | u(10) |
| } | |
| } | |
| } | |

$L_{pd}$: PEAK LUMINANCE OF TARGET DISPLAY
$L_{pc}$: PEAK LUMINANCE OF CONTENT $L_{pd}$: PEAK LUMINANCE OF TARGET DISPLAY
$L_{pc}$: PEAK LUMINANCE OF CONTENT $L_{pd}$: PEAK LUMINANCE OF TARGET DISPLAY
$L_{pc}$: PEAK LUMINANCE OF CONTENT
$L_{dc}$: Diffuse white LUMINANCE OF CONTENT $L_{pd}$: PEAK LUMINANCE OF TARGET DISPLAY
$L_{pc}$: PEAK LUMINANCE OF CONTENT
$L_{dc}$: Diffuse white LUMINANCE OF CONTENT $L_{pd}$: PEAK LUMINANCE OF TARGET DISPLAY
$L_{pc}$: PEAK LUMINANCE OF CONTENT
$L_{dc}$: Diffuse white LUMINANCE OF CONTENT
$L_{fc}$: LUMINANCE OF INTEREST OF CONTENT $L_{pd}$: PEAK LUMINANCE OF TARGET DISPLAY
$L_{pc}$: PEAK LUMINANCE OF CONTENT
$L_{dc}$: Diffuse white LUMINANCE OF CONTENT
$L_{fc}$: LUMINANCE OF INTEREST OF CONTENT $L_{pd}$: PEAK LUMINANCE OF TARGET DISPLAY
$L_{pc}$: PEAK LUMINANCE OF CONTENT
$L_{dc}$: Diffuse white LUMINANCE OF CONTENT $L_{pd}$: PEAK LUMINANCE OF TARGET DISPLAY
$L_{pc}$: PEAK LUMINANCE OF CONTENT
$L_{dc}$: Diffuse white LUMINANCE OF CONTENT $L_{pd}$: PEAK LUMINANCE OF TARGET DISPLAY
$L_{pc}$: PEAK LUMINANCE OF CONTENT
$L_{dc}$: Diffuse white LUMINANCE OF CONTENT
$L_{fc}$: LUMINANCE OF INTEREST OF CONTENT $L_{pd}$: PEAK LUMINANCE OF TARGET DISPLAY
$L_{pc}$: PEAK LUMINANCE OF CONTENT
$L_{dc}$: Diffuse white LUMINANCE OF CONTENT
$L_{fc}$: LUMINANCE OF INTEREST OF CONTENT

FIG. 28

| Syntax | No. of bits | Mnemonic | |
|---|---|---|---|
| ExtensionData() { | | | |
|   length | 32 | uimsbf | |
|   if(length !=0){ | | | |
|     data_block_start_address | 32 | uimsbf | |
|     reserved_for_word_align | 24 | bslbf | |
|     number_of_ext_data_entries | 8 | uimsbf | |
|     for (i=0; i<number_of_ext_data_entries; i++) { | | | |
|       ext_data_entry() { | | | |
|         ID1 | 16 | uimsbf | ←—2801 |
|         ID2 | 16 | uimsbf | ←—2802 |
|         ext_data_start_address | 32 | uimsbf | |
|         ext_data_length | 32 | uimsbf | |
|       } | | | |
|     } | | | |
|     for (i=0; i<L1; i++) { | | | |
|       padding_word | 16 | bslbf | |
|       padding_word | 16 | bslbf | |
|     } | | | |
|     data_block() | * | | |
|   } | | | |
| } | | | |

* 32+8*8(length − data_block_start_address)

FIG. 29

| display_mapping_luminance_point_metadata() { | Descriptor |
|---|---|
| num_luminance_points_minus1 | ue(v) |
| for(i=0; i<=num_luminance_points_minus1; i++) { | |
| luminance_point[i] | u(32) | ←―2901
| } | |
| } | |

FIG. 30

| display_mapping_luminance_point_metadata_table() { | Descriptor |
|---|---|
| for(pi_id=0; pi_id<number_of_PlayItems; pi_id++) { | |
| num_luminance_points_minus1 | ue(v) |
| for(i=0; i<=num_luminance_points_minus1; i++) { | |
| luminance_point[i] | u(32) | ←―3001
| } | |
| } | |
| } | |

# APPARATUS AND METHOD FOR TRANSMITTING AND RECEIVING HIGH DYNAMIC RANGE IMAGES

CROSS-REFERENCE TO RELATED APPLICATIONS

This application is a national phase entry under 35 U.S.C. § 371 of International Application No. PCT/JP2015/002945 filed Jun. 11, 2015, published on Feb. 4, 2016 as WO 2016/017058 A1, which claims the benefit of Japanese Priority Patent Application Nos. JP 2014-153320, filed in the Japanese Patent Office on Jul. 28, 2014, and JP 2014-182953 filed in the Japanese Patent Office on Sep. 9, 2014, the entire contents of which are incorporated herein by reference.

TECHNICAL FIELD

The technology disclosed in this specification relates to an image processing apparatus and an image processing method for processing image information, and particularly, to an image processing apparatus and an image processing method for transmitting/receiving or displaying high dynamic range images.

BACKGROUND ART

Recently, images have increasingly had a high dynamic range (HDR) due to a bit increase of imaging elements (image sensors). The dynamic range of an image can be generally represented by a ratio between minimum luminance and maximum luminance. An HDR image reaches a contrast ratio of 10000:1 or more, for example, between a maximum brightness color and a minimum brightness color, and thus can realistically represent a real world. An HDR image can record all luminance in a visible range, and can support a dynamic range and a color gamut equal to the visual characteristics of humans. An HDR image has advantages of being able to realistically represent shades, simulate exposure, represent glare, and so on.

While content producers capture HDR images as described above, displays in homes to view content are different in performance, including displays supporting standard dynamic range (SDR) with a dynamic range compressed to about one fortieth and displays conversely supporting HDR with a maximum luminance of 500 nit or 1000 nit, for example. Therefore, processing for adapting the dynamic range of original content to the performance of a display at an image output destination (hereinafter, also referred to as "display mapping") is necessary (see e.g. PTL 1).

However, when conversion of a dynamic range is performed simply by linear scaling in display mapping, a lot of information may be lost, resulting in an image greatly different to the human eye before and after the conversion. Such loss of information is contrary to the intension of a content producer or supplier.

CITATION LIST

Patent Literature

PTL 1: JP 2014-502480 W

SUMMARY OF INVENTION

Technical Problem

It is desirable to provide an excellent image processing apparatus and image processing method capable of preferably transmitting/receiving or displaying high dynamic range images.

Solution to Problem

According to an embodiment of the present disclosure, an image processing apparatus may include circuitry configured to receive image data; and receive metadata set based on the image data, the metadata including information serving as a display mapping reference to maintain a characteristic of the image data to a portion of the image data.

According to an embodiment of the present disclosure, an image processing method may include an image receiving step of receiving image data; and a metadata receiving step of receiving metadata set based on the image data, the metadata including information serving as a display mapping reference to maintain a characteristic of the image data to a portion of the image data.

According to an embodiment of the present disclosure, an image processing apparatus may include circuitry configured to transmit image data; and transmit metadata set based on the image data, the metadata including information serving as a display mapping reference to maintain a characteristic of the image data to a portion of the image data.

According to an embodiment of the present disclosure, an image processing method may include an image transmitting step of transmitting image data; and a metadata transmitting step of transmitting metadata set based on the image data, the metadata including luminance information serving as a display mapping reference to maintain a characteristic of the image data to a portion of the image data.

According to an embodiment of the present disclosure, an image processing apparatus may include circuitry configured to transmit image data; and transmit metadata set based on the image data, the metadata including information serving as a display mapping reference to maintain the image data to reflect a predetermined intention of a content producer or supplier.

According to an embodiment of the technology, an image processing apparatus includes:

an image transmitting unit that transmits image data; and
a metadata transmitting unit that transmits metadata set based on the image data, the metadata including luminance information useful in display mapping.

According to an embodiment of the technology, the metadata transmitting unit includes, in the metadata, information on Diffuse white luminance that represents a white luminance value serving as a reference in the image data transmitted from the image transmitting unit, and transmits the metadata.

According to an embodiment of the technology, the metadata transmitting unit includes, in the metadata, information on luminance of interest that represents a luminance value of a central object or an object of interest in the image data transmitted from the image transmitting unit, and transmits the metadata.

According to an embodiment of the technology, the metadata transmitting unit includes, in the metadata, information on peak luminance in the image data transmitted from the image transmitting unit, and transmits the metadata.

According to an embodiment of the technology, an image processing method includes:

an image transmitting step of transmitting image data; and a metadata transmitting step of transmitting metadata set based on the image data, the metadata including luminance information useful in display mapping.

According to an embodiment of the technology, an image processing apparatus including:

an image receiving unit that receives image data; and a metadata receiving unit that receives metadata set based on the image data, the metadata including luminance information useful in display mapping.

According to an embodiment of the technology, the image processing apparatus further includes:

a display unit; and a display mapping processing unit that performs display mapping of the image data based on the metadata.

According to an embodiment of the technology, the metadata receiving unit receives, as the metadata, at least one information of Diffuse white luminance that represents a white luminance value serving as a reference in the image data and luminance of interest that represents a luminance value of a central object or an object of interest in the image data (in each scene); and the display mapping processing unit performs the display mapping of the image data so that the Diffuse white luminance or the luminance of interest is maintained.

According to an embodiment of the technology, the metadata receiving unit receives information on peak luminance of the image data as the metadata; and the display mapping processing unit compresses the peak luminance of the image data to peak luminance of the display unit when the peak luminance of the image data is higher than the peak luminance of the display unit.

According to an embodiment of the technology, the metadata receiving unit receives, as the metadata, information on peak luminance of the image data and information on Diffuse white luminance that represents a white luminance value serving as a reference in the image data; and the display mapping processing unit compresses the peak luminance of the image data to peak luminance of the display unit and compresses luminance from the peak luminance to the Diffuse white luminance linearly or nonlinearly when the peak luminance of the image data is higher than the peak luminance of the display unit.

According to an embodiment of the technology, the metadata receiving unit receives, as the metadata, information on peak luminance of the image data and information on luminance of interest that represents a luminance value of a central object or an object of interest in the image data; and the display mapping processing unit compresses the peak luminance of the image data to peak luminance of the display unit, and compresses luminance from the peak luminance to the luminance of interest linearly or nonlinearly when the peak luminance of the image data is higher than the peak luminance of the display unit.

According to an embodiment of the technology, the metadata receiving unit receives, as the metadata, information on peak luminance of the image data, information on Diffuse white luminance that represents a white luminance value serving as a reference in the image data, and information on luminance of interest that represents a luminance value of a central object or an object of interest in the image data; and the display mapping processing unit compresses the peak luminance of the image data to peak luminance of the display unit, and compresses luminance from the peak luminance to the luminance of interest linearly or nonlinearly when the Diffuse white luminance is higher than the peak luminance of the display unit.

According to an embodiment of the technology, an image processing method includes:

an image receiving step of receiving image data; and a metadata receiving step of receiving metadata set based on the image data, the metadata including luminance information useful in display mapping.

Advantageous Effects of Invention

The technology disclosed in this specification can provide an excellent image processing apparatus and image processing method capable of preferably transmitting or receiving metadata related to dynamic range conversion of images, or preferably converting images in dynamic range based on metadata.

Effects described in this specification are only illustrative, and the effects of the present disclosure are not limited to them. The present disclosure may have further additional effects in addition to the above effects.

Still other objects, features, and advantages of the technology disclosed in this specification will be made obvious by more detailed description based on an embodiment described below and accompanying drawings.

BRIEF DESCRIPTION OF DRAWINGS

FIG. 6 is a chart showing an example of the syntax of dynamic range conversion definition information "knee_function_info SEI".

FIG. 28 is a chart showing an example of the syntax of a database file in Blu-ray Disc.

FIG. 29 is a chart showing an example of the syntax of extension data display_mapping_luminance_point_metadata ( ) stored in the database file in the Blu-ray Disc.

FIG. 30 is a chart showing an example of the syntax of extension data display_mapping_luminance_point_metadata_table ( ) stored in the database file in the Blu-ray Disc.

DESCRIPTION OF EMBODIMENTS

Hereinafter, an embodiment of the technology disclosed in this specification will be described in detail with reference to the drawings.

Figure 1:
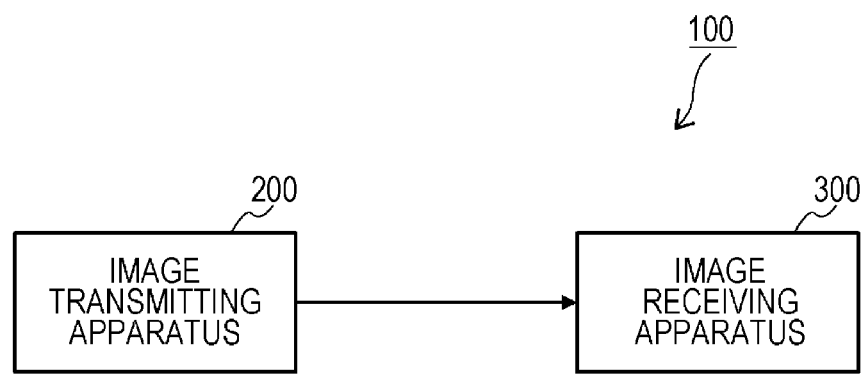
FIG. 1 is a diagram schematically illustrating a configuration example of an image transmission system 100 to which the technology disclosed in this specification is applied.

FIG. 1 schematically illustrates a configuration example of an image transmission system 100 to which the technology disclosed in this specification is applied. The image transmission system 100 illustrated includes an image transmitting apparatus 200 that transmits an image stream and an image receiving apparatus 300 that receives the image stream and outputs it for display.

When the image transmission system 100 is applied to an Internet distribution service such as Over The Top (OTT), the image transmitting apparatus 200 is a streaming server, and the image receiving apparatus 300 is a client constituted by a personal computer or the like. When the image transmission system 100 is applied to a digital broadcast service, the image transmitting apparatus 200 is a broadcast station, and the image receiving apparatus 300 is a television or the like installed in a home. When the image transmission system 100 is applied to a recording/reproducing system such as Ultra High Definition (UHD)-Blu-ray (registered trademark) Disc (BD), the image transmitting apparatus 200 corresponds to a recording apparatus that records images on a medium such as BD, and the image receiving apparatus 300 is a media reproducing apparatus such as a BD player and a display to output reproduced images for display, or the like. In the image transmission system 100, commercial content such as movies is transmitted. In an Internet distribution service or a broadcast service, for example, content is transmitted as a coded stream such as MPEG2 TS. In a reproducing system such as UHD-BD, for example, uncompressed reproduced stream is transmitted from a BD player to a display via a High Definition Multimedia Interface (HDMI) (registered trademark) interface.

Various industries that provide image content, such as Internet distribution service, broadcast, and UHD-BD have expected extension of the dynamic range of luminance components and high-contrast HDR technology in addition to high-definition content element 4K resolution technology. The HDR technology allows all luminance in a visible range to be recorded, and allows a dynamic range and a color gamut equal to the visual characteristics of humans to be supported. The display industry has been presenting products equipped with a function supporting extension of the dynamic range of luminance components. For example, a liquid crystal display using back-lit light-emitting diodes (LEDs) can faithfully reproduce the glitter of light and can implement high-luminance image representation.

Figure 2:
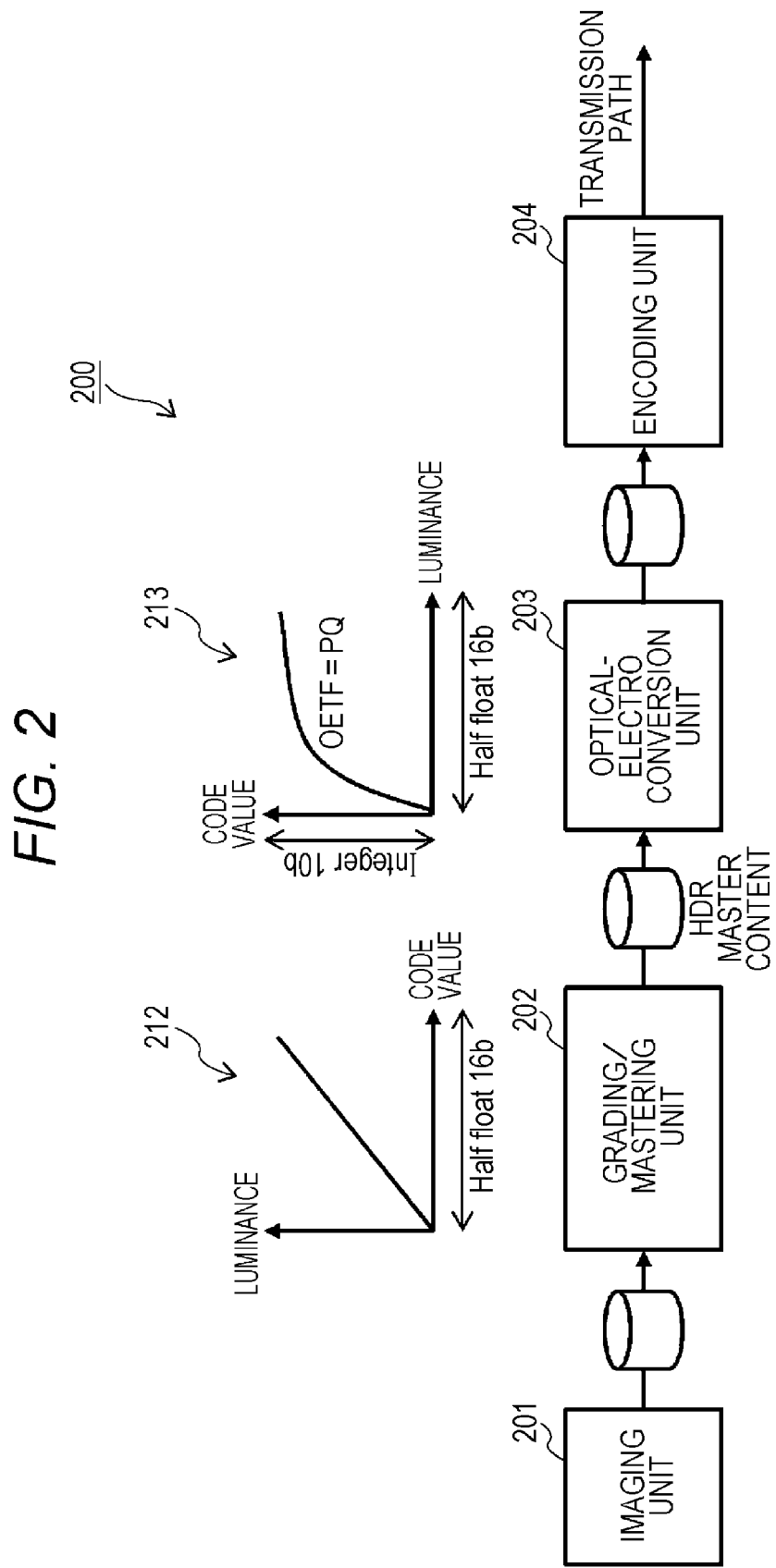
FIG. 2 is a diagram schematically illustrating a workflow of processing HDR content at an image transmitting apparatus 200 (or at a content producer).

FIG. 2 schematically illustrates a workflow of processing HDR content at the image transmitting apparatus 200 (or at the content producer).

An imaging unit 201 is equipped with a 4K camera, for example, to record a color image in a wide color gamut color system based on ITU-R Recommendation BT.2020.

Next, a grading/mastering unit 202 performs grading or mastering processing on imaged content to linearly convert a code value into luminance using a conversion table as shown by reference numeral 212 to generate HDR master content. Metadata generation processing is performed on the HDR master content as described below.

Next, an optical-electro conversion unit 203 nonlinearly converts luminance into a ten-bit code value using an OETF conversion table as shown by reference numeral 213 to convert a light-beam-form luminance signal of the HDR master content into a panel drive signal.

An encoding unit 204 encodes the HDR master content and its metadata to generate a stream in a predetermined coded form such as Moving Picture Experts Group ? 2 Transport Stream (MPEG-2 TS). Then, the generated coded stream is transmitted to the image receiving apparatus 300 via a transmitting interface not shown.

Figure 3:
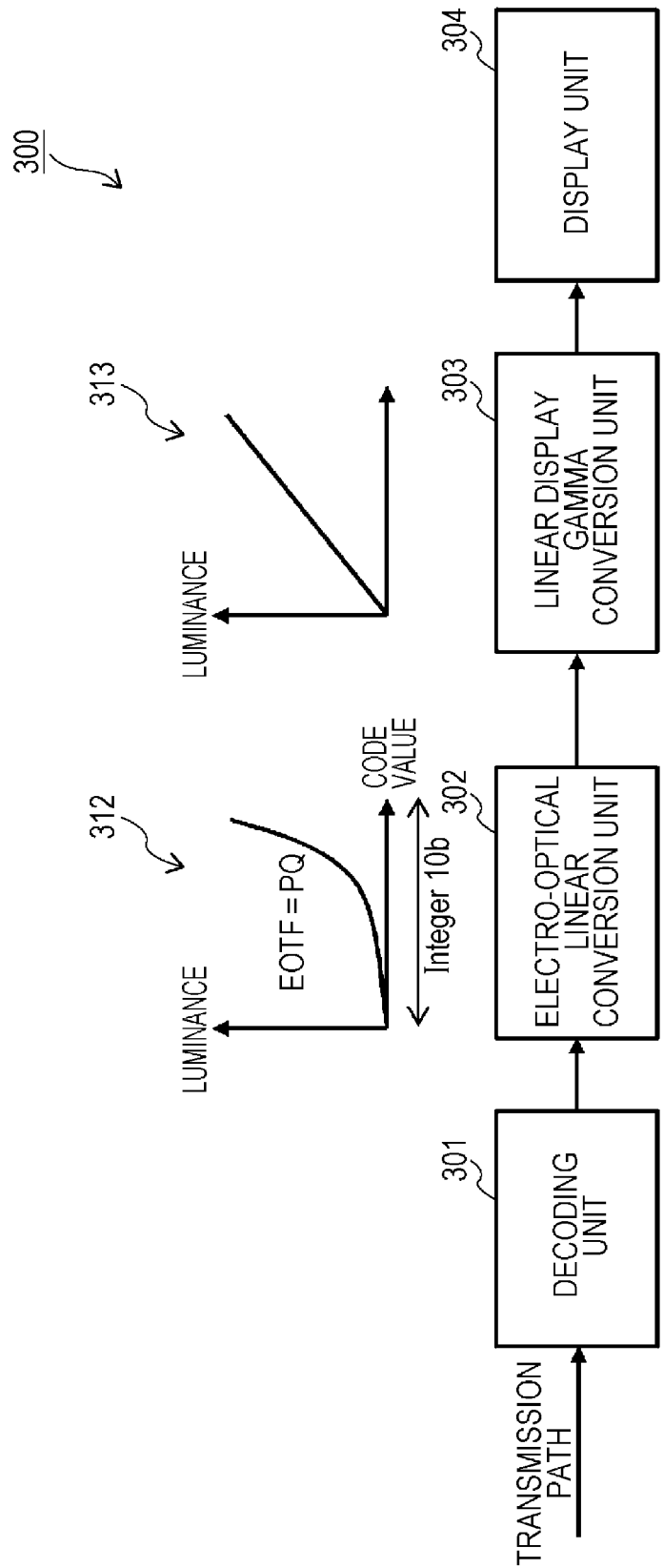
FIG. 3 is a diagram schematically illustrating a workflow of processing HDR content at an image receiving apparatus 300.

FIG. 3 schematically shows a workflow of processing HDR content at the image receiving apparatus 300.

A decoding unit 301 decodes the coded stream received at a receiving interface not shown into the original content (panel drive signal), and extracts metadata.

Next, an electro-optical linear conversion unit 302 converts the panel drive signal including the decoded ten-bit code value into a light-beam-form luminance signal, using an EOTF conversion table as shown by reference numeral 312. In this embodiment, dynamic range conversion processing based on luminance information written in the metadata is performed on the light-beam-form luminance signal after the EOTF conversion (described below).

Next, a linear display gamma conversion unit 303 performs gamma processing on the luminance signal, using a linear conversion table shown by reference numeral 313 for conversion into a panel drive signal conformed to the input characteristics of a display panel. A display unit 304 including a liquid crystal display panel or the like is driven according to the panel drive signal to display the content on the screen.

The application of the HDR technology in the image transmission system 100 conceivably causes a situation where the respective dynamic ranges of the image transmitting apparatus 200 and the image receiving apparatus 300 do not agree. In this case, the image receiving apparatus 300 needs display mapping to perform dynamic range conversion on received images to adapt them to its performance.

However, it is feared that dynamic range conversion performed simply by linear scaling in display mapping can cause a lot of information to be lost, resulting in an image greatly different to the human eye before and after the conversion. Such information loss is contrary to the intension of the content producer or supplier.

Therefore, the present inventors consider that in order to build an HDR world in the image transmission system 100, it is necessary to establish an HDR content production workflow in addition to the provision of HDR content at the producer or at the image transmitting apparatus 200 and the equipment of a display device supporting HDR at the image receiving apparatus 300.

Further, it is necessary to prevent the loss of the intention of a content producer or supplier when dynamic range conversion of an HDR image is performed by display mapping at the image receiving apparatus 300 or the like. Thus, the technology disclosed in this specification transmits the intension of a content producer or supplier as metadata associated with an image stream instead of performing simple linear scaling.

The image transmission system 100 defines metadata to store information showing the intension of a content producer or supplier, such as the peak luminance, color gamut, and electro-optical transfer function (EOTF) of the content in mastering or grading, in a series of workflow of an HDR content production process, imaging, editing, encoding/decoding, transmission, and display. When content is transmitted from the image transmitting apparatus 200 to the image receiving apparatus 300, such metadata is transmitted together. Then, the image receiving apparatus 300 performs processing such as dynamic range conversion on the received content utilizing the metadata, thereby being able to implement effective HDR image display that reflects the intention of the content producer or supplier.

Metadata to reflect the intention of a content producer or supplier can be broadly classified into two types (1) and (2) below.

(1) Metadata acquirable in authoring or mastering of content (2) Metadata necessary (or strongly required) in display mapping Elements deemed useful in display mapping can include the following (a) to (d).

(a) Peak luminance of a monitor display used in mastering of content
(b) Peak luminance of content
(c) Diffuse white luminance
(d) Luminance of interest Here, peak luminance of a mastering monitor in (a) can be automatically detected as a basic specification of hardware. Peak luminance of content in (b) is maximum luminance in an image or a scene, and corresponds to a portion at which light is reflected, for example, and can be automatically detected by the luminance analysis of the image. Diffuse white luminance in (c) is the luminance of white serving as a reference in an image or scene. Diffuse white luminance is white that occupies a large area, and thus can be automatically detected by the luminance analysis of the image, and also can be changed in detected value as desired by the content producer. Luminance of interest in (d) is the luminance of a central object of the scene that the content producer wants to show mainly, and is set by the content producer. For example, in a scene in which a person appears, the luminance of interest is luminance corresponding to a Flesh tone. Of the above four types of luminance information, (a) is a static value determined by the hardware specification, and (b) to (d) are dynamic values varying from scene to scene. A value or values of the luminance of interest may be defined as (i) R, G and B values; (ii) representative of R, G and B values; (iii) a combination of R, G and B values; or (iv) a maximum of R, G and B values. Diffuse White luminance may be similar to a luminance level generally called 100% white luminance. Luminance of interest may be similar to a luminance level of about 18% of 100% white luminance (18% gray) or an average luminance.

Figure 4:
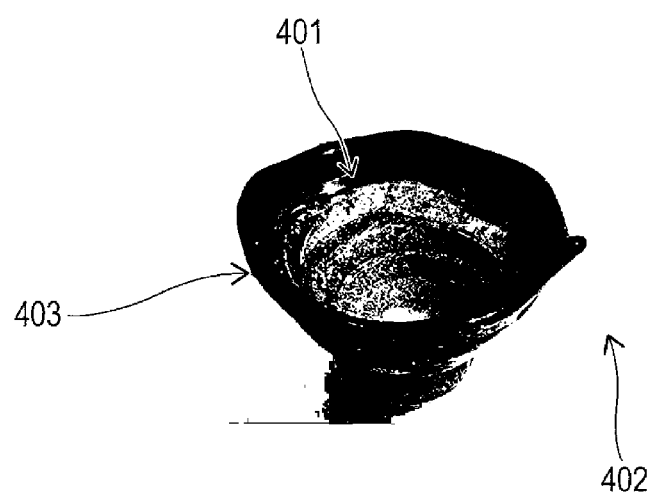
FIG. 4 is an illustration showing luminance information pieces to be a base in display mapping, with a captured image as an example.

The luminance information pieces (b) to (d) serving as a reference in display mapping will be described with an image in which a glasswork placed on a white table is captured as shown in FIG. 4 as an example. On the surface of the glasswork, a portion reflecting light corresponds to peak luminance 401. The white table occupies a large area of the scene, and corresponds to Diffuse White luminance 402. The glasswork is a central object of the scene shown in FIG. 4, and the content producer sets a portion of the surface that he or she wants to show mainly as luminance of interest 403.

For example, when display mapping is performed at the image receiving apparatus 300 on HDR content transmitted from the image transmitting apparatus 200, it is considered to be strongly expected by the content producer or supplier to maintain luminance of luminance of interest and below. It is also considered to be expected by the content producer or supplier to maintain luminance of Diffuse white luminance and below to some extent.

Figure 5:
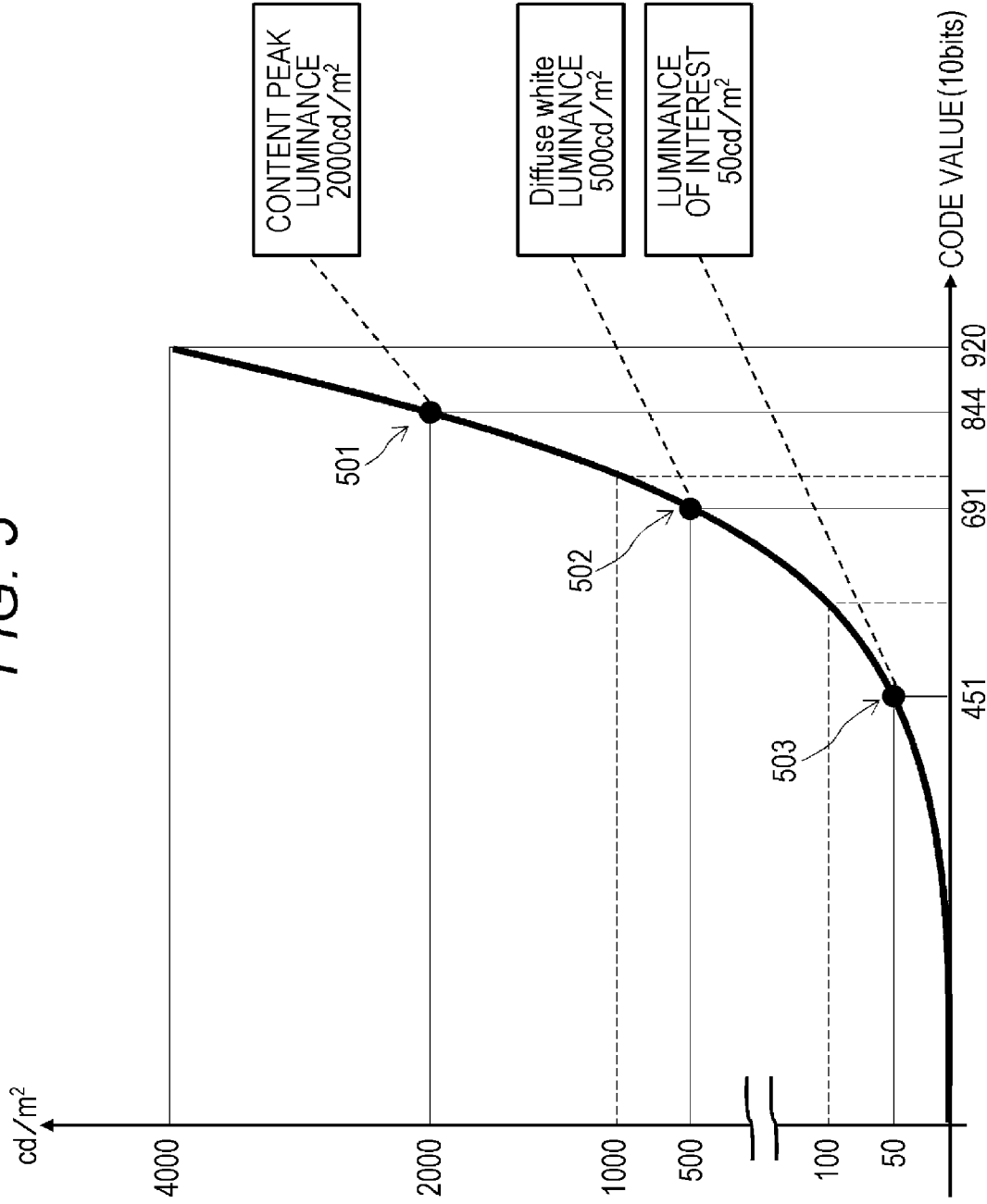
FIG. 5 is a graph showing luminance information serving as a reference in display mapping on EOTF characteristics.

FIG. 5 shows an example of luminance information (b) to (d) serving as a reference in display mapping on EOTF characteristics (the horizontal axis represents ten-bit code value of luminance, and the vertical axis represents linear luminance value [cd/m$^2$]). In the graph, reference numeral 501 denotes content peak luminance (Peak white). In the illustrated example, the peak luminance is 2000 cd/m$^2$ and 844 in ten-bit code value. Reference numeral 502 denotes Diffuse white luminance. A reference white luminance value is set as Diffuse white luminance. Specifically, Diffuse white luminance corresponds to dominant white such as a table or a shirt appearing in a scene, and has a luminance of 300 to 500 cd/m², corresponding to 100% white in the related-art standard dynamic range (SDR). In the illustrated example, the Diffuse white luminance is set at 500 cd/m² and 691 in ten-bit code value. Reference numeral 503 denotes luminance of interest. A Flesh tone of a person or a luminance value of an object central to the scene is set as luminance of interest. In the illustrated example, the luminance of interest is set at 50 cd/m² and 451 in ten-bit code value.

In the image transmission system 100 according to this embodiment, the image transmitting apparatus 200 transmits the above luminance information (a) to (d) as metadata for the image receiving apparatus 300 to implement appropriate display mapping. The image receiving apparatus 300 can perform the display of content suitable for the individual performance, using these pieces of luminance information (a) to (d). Specifically, Diffuse white luminance or luminance of interest, which is a luminance point to be maintained, is specified using metadata from an HDR content transmitting side. On the other hand, an HDR content receiving side refers to the luminance point specified by the metadata when compressing or extending the dynamic range in display mapping, thereby being able to implement image display according to the intension of the content producer or supplier. However, compression or extension processing on a dynamic range (how to use a luminance point specified by metadata in conversion processing) is basically put into the hands of a receiving side (display side). Other than the above luminance information (b) to (d), 100% white luminance, 18% gray, average luminance, or the like may be included in metadata.

Metadata should be dynamic to reflect the above luminance information (a) to (d) scene by scene.

As a container for transmitting the above luminance information (a) to (d) useful in display mapping, Supplemental Enhancement Information (SEI) that has been defined in MPEG can be used. Alternatively, SEI to be a transmission container of luminance information (a) to (d) may be newly defined, or a transmission container other than SEI may be used.

Hereinafter, description will be made with a case where "knee_function_info SEI (Supplemental Enhancement Information)" defined as dynamic range conversion definition information on uncompressed image data in MPEG is used as a transmission container of luminance information (a) to (d) as an example.

FIG. 6 shows an example of the syntax of dynamic range conversion definition information "knee_function_info SEI". The original meaning of each parameter will be described.

In this knee_function_info 600, a knee conversion ID (knee_function_id) 601 and a knee conversion cancel flag (knee_function_cancel_flag) 602 are set.

The knee conversion ID 601 is an ID unique to the purpose of knee conversion that is knee compression or knee extension. In this embodiment, when the knee_function_info SEI is used as original dynamic range conversion definition information, the knee conversion ID 601 is set to low level "0", and when it is used as a transmission container of the above luminance information (a) to (d), the knee conversion ID 601 is set to high level "1". The knee conversion cancel flag 602 is a flag that indicates whether to cancel the continuity of previous knee_function_info. In the knee conversion cancel flag 602, when the continuity of previous knee_function_info is canceled, high level "1" is set, and when the continuity of previous knee_function_info is not canceled, low level "0" is set.

When the knee conversion cancel flag 602 is low level "0", dynamic range conversion definition information is set in the knee_function_info 600. In the dynamic range conversion definition information, a persistence flag (knee_function_persistence_flag) 603, a compression/extension flag (mapping_flag) 604, input image dynamic range information (input_d_range) 605 in which peak luminance of an input image (in 0.1% units) is stored, input image display display maximum luminance information (input_disp_luminance) 606 in which brightness of a display (in 0.1% units) corresponding to the peak luminance of an input image is stored, output image dynamic range information (output_d_range) 607 in which peak luminance of an output image (in 0.1% units) is stored, an output display display maximum luminance information (output_disp_luminance) 608 in which brightness of the display (in 0.1% units) corresponding to the peak luminance of the output image is stored, and knee point number information (num_knee_point_minus1) 609 are set. Further, as many loops 610 of information on each knee point as the number of the knee point number information 609 are arranged. In each knee point information loop, pre-conversion knee point information (input_knee_point) 611 and post-conversion knee point information (output_knee_point) 612 on each knee point are set for each knee point.

The persistence flag 603 indicates whether once transmitted knee_function_info 600 is valid thereafter or one-time. When it is valid only for a picture to which the knee_function_info 600 is added, low level "0" is set in the persistence flag 603. When it is valid until a stream changes or is valid until a new knee conversion ID 601 comes, high level "1" is set in the persistence flag 603.

The compression/extension flag 604 is a flag that indicates whether the knee conversion is knee compression. Specifically, in a case where there is a single knee point, when the pre-conversion knee point information is more than or equal to the post-conversion knee point information, it can be determined that the knee conversion is knee extension. When the pre-conversion knee point information is smaller than the post-conversion knee point information, it can be determined that the knee conversion is knee compression. However, when there is a plurality of knee points, it cannot be correctly determined whether the knee conversion is knee extension or knee compression based on the magnitude relationship between the pre-conversion knee point information and the post-conversion knee point information. Thus the compression/extension flag 604 is set. Even when there is a single knee point, the compression/extension flag 604 may be set. In the compression/extension flag 604, high level "1" is set when the knee conversion is knee compression, and low level "0" is set when it is knee extension.

The knee point number information 609 is a value obtained by subtracting 1 from the number of knee points. Order i (i is an integer not less than 0) in which the pre-conversion knee point information 611 and the post-conversion knee point information 612 on knee points are set is the ascending order of the pre-conversion knee point information 611. In each of as many subsequent loops as the knee points, the pre-conversion knee point information 611 and the post-conversion knee point information 612 on the ith knee point are stored.

The pre-conversion knee point information 611 is information representing a knee point of an image to be encoded before conversion in dynamic range conversion, and is represented by a permillage of the knee point when the maximum value of luminance of the image to be encoded is set at 1000‰. A knee point is luminance other than zero at a starting point of a luminance range knee-converted at the same conversion ratio in the dynamic range of luminance of an image to be encoded.

The post-conversion knee point information 612 is information representing a starting point of a luminance range corresponding to a knee-converted luminance range with a knee point as a starting point, on an image after conversion in dynamic range conversion. Specifically, the post-conversion knee point information (output_knee_point) is represented by a permillage of the luminance of an image after conversion corresponding to a knee point when the maximum value of the luminance of the image after conversion is set at 1000‰.

When the knee_function_info SEI shown in FIG. 6 is used as a transmission container for the above luminance information (a) to (d) useful in display mapping, the luminance value of luminance of interest is stored as first pre-conversion knee point information and first post-conversion knee point information, the luminance value of Diffuse white is stored as second pre-conversion knee point information and first post-conversion knee point information, and the peak luminance value of content is stored as third pre-conversion knee point information and first post-conversion knee point information. Semantics of each parameter when knee_function_info SEI is used as a transmission container for luminance information is summarized in Table 1 below.

TABLE 1

| HEVC Metadata | Syntax | Semantics |
|---|---|---|
| Knee function information SEI | input_disp_luminance | Normalized luminance value of 1.0 |
| Knee function information SEI (1st knee point) | input_knee_point[0] output_knee_point[0] | Luminance of interest value |
| Knee function information SEI (2nd knee point) | input_knee_point[1] output_knee_point[1] | Diffuse white luminance value |
| Knee function information SEI (3rd knee point) | input_knee_point[2] output_knee_point[2] | Peak luminance value |

Figure 7:
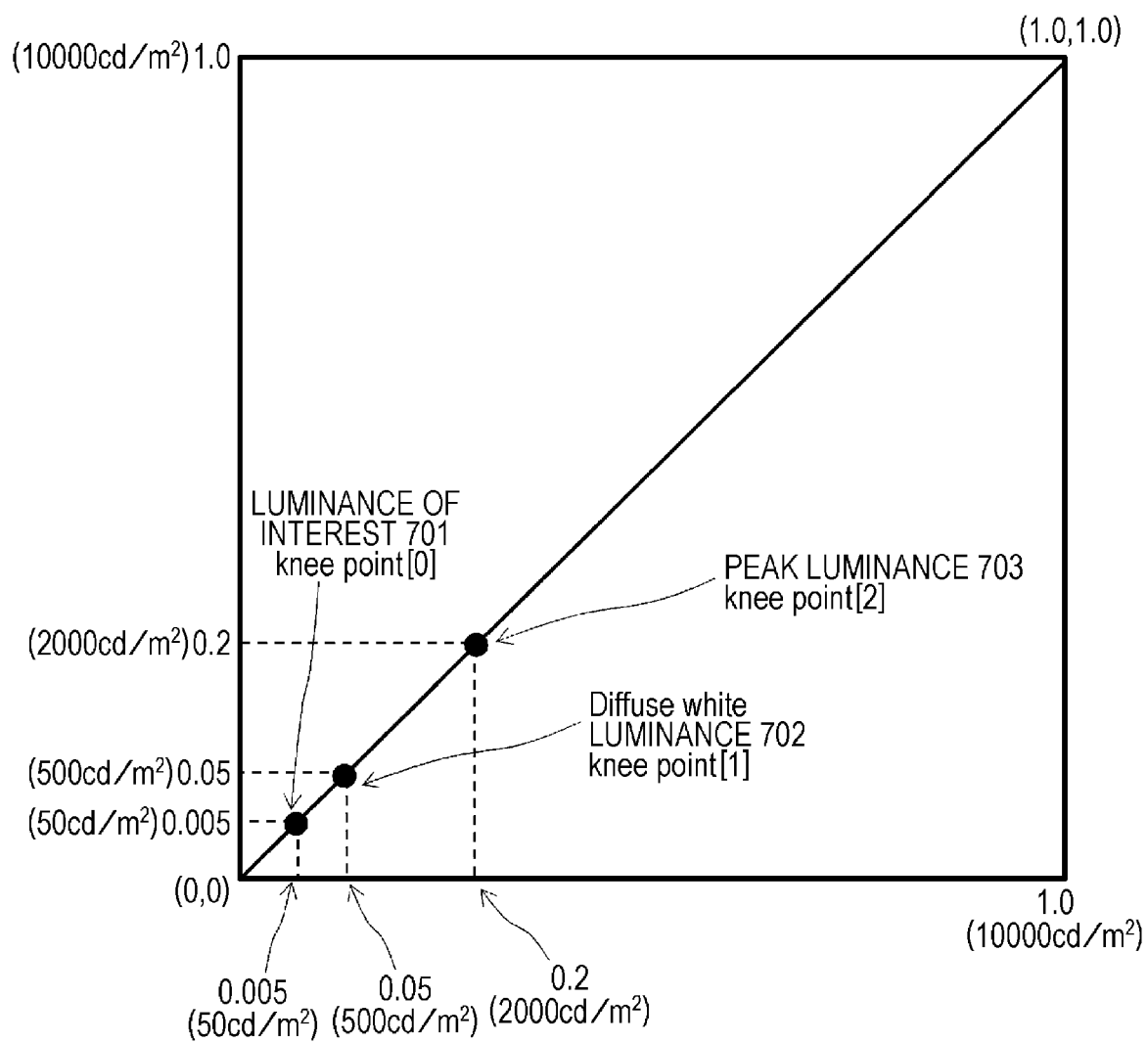
FIG. 7 is a graph showing a parameter setting example shown in Table 2 as dynamic range conversion definition information.

An example in which luminance information (b) to (d) is set at respective parameters in knee_function_info SEI is shown in Table 2 below. FIG. 7 shows parameter setting examples 701, 702, and 703 shown in Table 2 as dynamic range conversion definition information. In addition to the above luminance information (b) to (d), 100% white luminance, 18% gray, average luminance, or the like may be included in the metadata.

TABLE 2

| Field Name | Setting Value Example |
|---|---|
| input/output_d_range | 0 |
| input/output_disp_luminance | 10000 |
| num_knee_points_minus1 | 2 |
| input/output_knee_point[0] | 5 |
| input/output_knee_point[1] | 50 |
| input/output_knee_point[2] | 200 |

Premise
Content peak luminance = 2000 cd/m$^2$
Luminance of interest = 50 cd/m$^2$
Diffuse white luminance = 500 cd/m$^2$
EOTF = PQ In a system in which content is recorded on Blu-ray Disc for distribution such as UHD-BD, a method of storing luminance conversion information in a database file in Blu-ray Disc is possible other than using SEI as a transmission container as described above. A case where a database file in Blu-ray Disc is used as a transmission container of luminance information (a) to (d) will also be described.

Database files used as a transmission container (storage location) of luminance information (a) to (d) useful in display mapping can include an index file (Index.bdmv file), a moving image reproduction list file (Movie PlayList file), and a clip information file (Clip Information file). Extension Data ( ) in one of these database files is defined to store luminance information (a) to (d) useful in display mapping therein. Storage methods for the storage locations are summarized in Table 3 below.

TABLE 3

| Storage Location | Syntax Example |
|---|---|
| Index.bdmv file | ExtensionData ( ) of display_mapping_luminance_point_metadata ( ) is defined to show luminance information useful in display mapping (static over the entire disc) there. |
| MoviePlayList file | ExtensionData ( ) with a structure similar to that in Index.bdmv file is defined to show luminance information static over the entire MoviePlaylist. |
| MoviePlayList file | ExtensionData ( ) of display_mapping_luminance_point_metadata_table ( ) is defined to have a table of blocks showing luminance information useful in display mapping that is static in each PlayItem. |
| Clip Information file | ExtensionData ( ) with a structure similar to that in Index.bdmv is defined to show luminance information static over the entire Clip. |

The index file (Index.bdmv file) is a basic file managing the entire medium, and manages the correspondence relationships between titles shown to users and moving image objects (MovieObject). When the index file (Index.bdmv file) is used as a location to store luminance information, ExtensionData ( ) of display_mapping_luminance_point_metadata ( ) is defined to show luminance information useful in display mapping (static over the entire disc) there.

The moving image reproduction list file (Movie PlayList file) is a file in which information pieces on moving image reproduction units (Movie PlayList) are compiled. When the moving image reproduction list file (Movie PlayList file) is used as a location to store luminance information, ExtensionData ( ) with a structure similar to that in the index file (Index.bdmv file) is defined to show luminance information static over the entire Movie Playlist.

Alternatively, when the moving image reproduction list file (Movie PlayList file) is used as a location to store luminance information, ExtensionData ( ) of display_mapping_luminance_point_metadata_table ( ) is defined to have a table of blocks showing luminance information useful in display mapping that is static in each reproduced item (PlayItem).

In the clip information file (Clip Information file), information on a stream necessary for reproducing an actual stream is written and exists with a recorded Clip AV Stream file in pairs. When the clip information file (Clip Information file) is used as a location to store luminance information, ExtensionData ( ) with a structure similar to that in the index file (Index.bdmv file) is defined to show luminance information static over the entire Clip.

FIG. 28 shows an example of the syntax of a database file in Blu-ray Disc. A combination of the values of ID1 and ID2 denoted by reference numerals 2801 and 2802, respectively defines the type of extension data ExtensionData ( ). The correspondence relationships between combinations of ID1 and ID2 and extension data entries are illustrated in Table 4 below. In the table, with (ID1, ID2)=(0xaaaa, 0xbbbb), display_mapping_luminance_point_metadata ( ) is stored, and with (ID1, ID2)=(0xcccc, 0xdddd), display_mapping_luminance_point_metadata_table ( ) is stored. Index Table and Movie PlayList file become MoviePlayList file and Clip Information file, depending on a location to store.

TABLE 4

| ID1 | ID2 | Data in Extension Data Entry | Storage Location |
| --- | --- | --- | --- |
| 0x0001 | 0x0001 | pip_metadata | MoviePlayList file |
| 0x0001 | 0x0002 | HDMV_LPCM_down_mix_coefficient | Clip Info file |
| 0x0002 | 0x0001 | STN_table_SS | MoviePlayList file |
| ... | ... | | |
| 0xaaaa | 0xbbbb | display_mapping_luminance_point_metadata | |
| 0xcccc | 0xdddd | display_mapping_luminance_point_metadata_table | |

FIGS. 29 and 30 show examples of the syntax of extension data stored in a database file of Blu-ray Disc. Provided that FIG. 29 is an example of the syntax of display_mapping_luminance_point_metadata ( ), and FIG. 30 is an example of the syntax of display_mapping_luminance_point_metadata_table ( ). In the examples shown in FIGS. 29 and 30, it is previously arranged between the image transmitting apparatus 200 and the image receiving apparatus 300 what luminance type of luminance value is transmitted. In FIGS. 29 and 30, content peak luminance, Diffuse White luminance, and luminance of interest are stored in order in fields luminance_point [i] denoted by reference numerals 2901 and 3001. Provided that it shall be previously arranged between the image transmitting apparatus 200 and the image receiving apparatus 300 what luminance the ith field indicates.

Table 5 below shows field setting examples in the syntax shown in FIGS. 29 and 30. Provided that 2 is set as stored luminance point number information (num_luminance_points_minus1), and luminance of interest is assigned to i=0, Diffuse White luminance to i=1, and content peak luminance to i=2, respectively. For the luminance of interest, 50 cd/m² is set, for the Diffuse White luminance, 100 cd/m² is set, and for the content peak luminance, 2000 cd/m² is set.

TABLE 5

| Field Name | Setting Example |
| --- | --- |
| num_luminance_points_minus1 | 2 |
| luminance_point[0] | 50 |
| luminance_point[1] | 100 |
| luminance_point[2] | 2000 |

Figure 31:
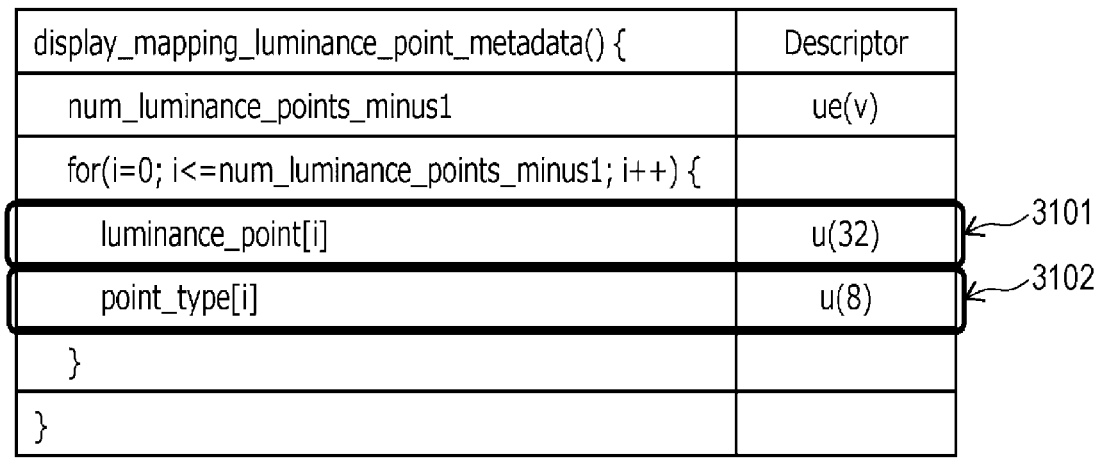
FIG. 31 is a chart showing another example of the syntax of extension data display_mapping_luminance_point_metadata ( ) stored in the database file in the Blu-ray Disc.
Figure 32:
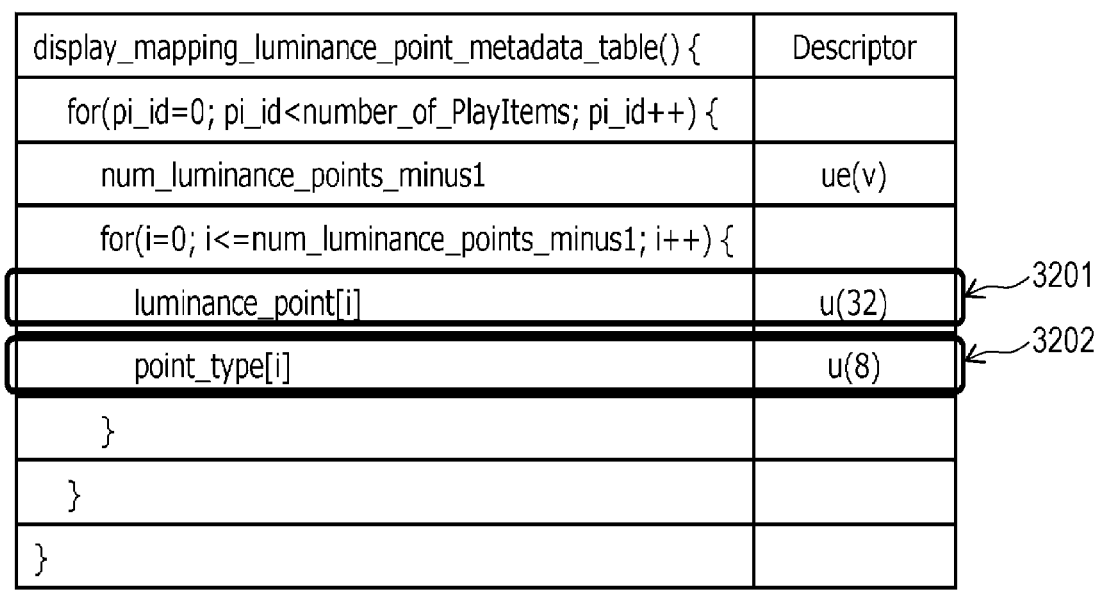
FIG. 32 is a chart showing another example of the syntax of extension data display_mapping_luminance_point_metadata_table ( ) stored in the database file in the Blu-ray Disc.

FIGS. 31 and 32 show other examples of the syntax of extension data stored in a database file of Blu-ray Disc. Provided that FIG. 31 is an example of the syntax of display_mapping_luminance_point_metadata ( ) and FIG. 32 is an example of the syntax of display_mapping_luminance_point_metadata_table ( ).

In the examples shown in FIGS. 31 and 32, it is not previously arranged between the image transmitting apparatus 200 and the image receiving apparatus 300 what luminance type of luminance value is transmitted, and a luminance type is specified in extension data. The image transmitting apparatus 200 can selectively transmit a luminance value of a desired luminance type. In the example shown in FIG. 31, a luminance value of a luminance type specified by reference numeral 3102 is stored in a field luminance_point [i] denoted by reference numeral 3101. Likewise, in the example shown in FIG. 32, a luminance value of a luminance type specified by reference numeral 3202 is stored in a field luminance_point [i] denoted by reference numeral 3201. Provided that it shall be previously arranged between the image transmitting apparatus 200 and the image receiving apparatus 300 what luminance the ith luminance type indicates. An example of setting luminance types is shown in Table 6 below.

TABLE 6

| point_type | Meaning |
| --- | --- |
| 0 | Reserved |
| 1 | Flesh tone |
| 2 | Diffuse White |
| 3 | Peak |
| 4 | 100% White |
| 5 | 18% gray |
| 6 | Average |
| 7-255 | |

Table 7 below shows a field setting example in the syntax shown in FIGS. 31 and 32. Provided that 2 is set as stored luminance point number information (num_luminance_points_minus1). For a luminance value luminance_point [0] with i=0, 50 cd/m² is set, and its luminance type point_type [0] is designated as 1 or luminance of interest. For a luminance value luminance_point [1] with i=1, 100 cd/m² is set, and its luminance type point_type [1] is designated as 2 or Diffuse White luminance. For a luminance value luminance_point [2] with i=2, 2000 cd/m² is set, and its luminance type point_type [2] is designated as 3 or content peak luminance.

TABLE 7

| Field Name | Setting Example |
| --- | --- |
| num_luminance_points_minus1 | 2 |
| luminance_point[0] | 50 |
| point type[0] | 1 (luminance of interest) |
| luminance_point[1] | 100 |
| point_type[1] | 2 (Diffuse White luminance) |
| luminance point[2] | 2000 |
| point_type[2] | 3 (peak luminance) |

Thus, in the image transmission system 100 according to this embodiment, the image transmitting apparatus 200 transmits the above luminance information (a) to (d) useful in display mapping in a transmission container such as knee_function_info SEI or a database file of Blu-ray Disc. On the other hand, a receiving side of HDR content refers to a luminance point specified in metadata when compressing or extending dynamic rage in display mapping, thereby being able to implement image display according to the intension of a producer or supplier of the content. Specifically, in compression or extension, it is expected to maintain luminance of luminance of interest and below and to maintain luminance of Diffuse white and below to some extent instead of linearly scaling a dynamic range. It is basically left to processing at the image receiving apparatus 300 (display) how to use a luminance point specified in metadata.

Figure 8:
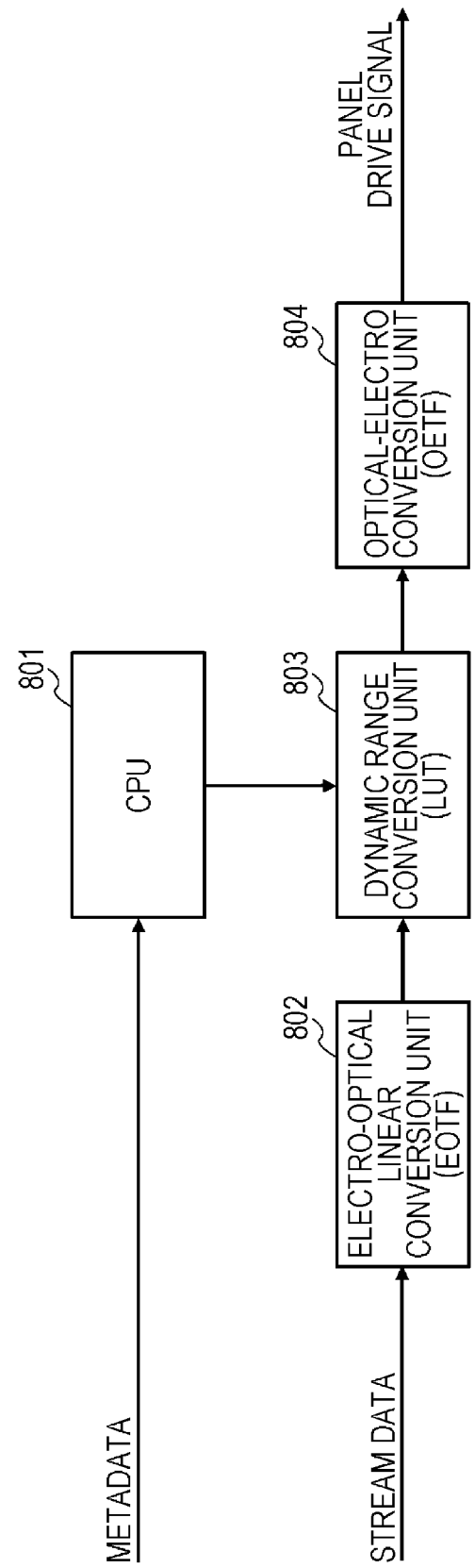
FIG. 8 is a block diagram of processing HDR image stream data based on metadata.

FIG. 8 shows an example of a block diagram of processing HDR image stream data based on metadata in the image receiving apparatus 300. The figure corresponds to processing after decoding at the decoding unit 301 in the image receiving apparatus 300 shown in FIG. 3.

When a coded stream such as MPEG2 TS is transmitted from the image transmitting apparatus 200, the decoding unit 301 MPEG decodes it, and outputs HDR stream data and metadata. When uncompressed data is transmitted from the image transmitting apparatus 200, an HDMI (registered trademark) receiving unit (not shown) outputs HDR stream data and metadata.

An electro-optical linear conversion unit 802 has an EOTF table for converting HDR stream data into a light-beam-form luminance signal, and converts input HDR stream data into a light-beam-form luminance signal.

A dynamic range conversion unit 803 has a lookup table (LUT) for converting the dynamic range of a light-beam-form luminance signal. A central processing unit (CPU) 801, when receiving metadata, extracts luminance information (a) to (d) as described above, and sets a LUT based on these pieces of information. Then, the dynamic range conversion unit 803 converts the dynamic range of the light-beam-form luminance signal according to the LUT. Dynamic range conversion is aimed at display mapping for adaption to the performance of the display unit 304 of the image receiving apparatus 300 itself, and the details are left to description below.

An optical-electro conversion unit 804 has an OETF table for converting a light-beam-form luminance signal into a panel drive signal, and converts a luminance signal after dynamic range conversion into a panel drive signal adapted to the input characteristics of the display unit 304.

Figure 9:
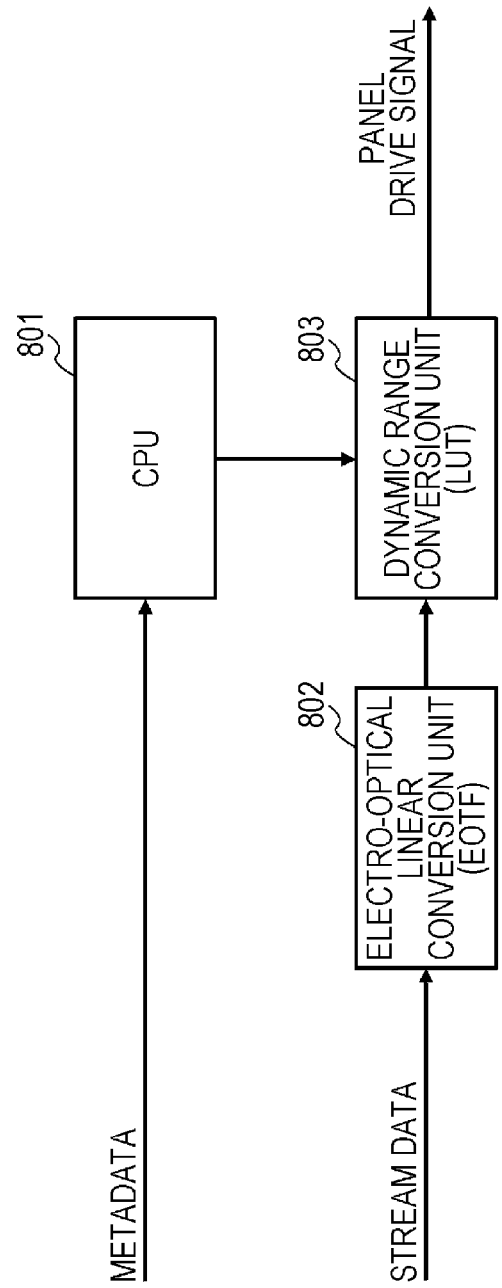
FIG. 9 is a diagram illustrating a modification of the processing blocks shown in FIG. 8.

FIG. 9 shows a modification of the processing blocks shown in FIG. 8. The conversion table OETF used in the optical-electro conversion unit 804, whose contents are fixed, is thus integrated with the LUT used by the dynamic range conversion unit 803 to omit the optical-electro conversion unit 804 as a circuit.

Figure 10:
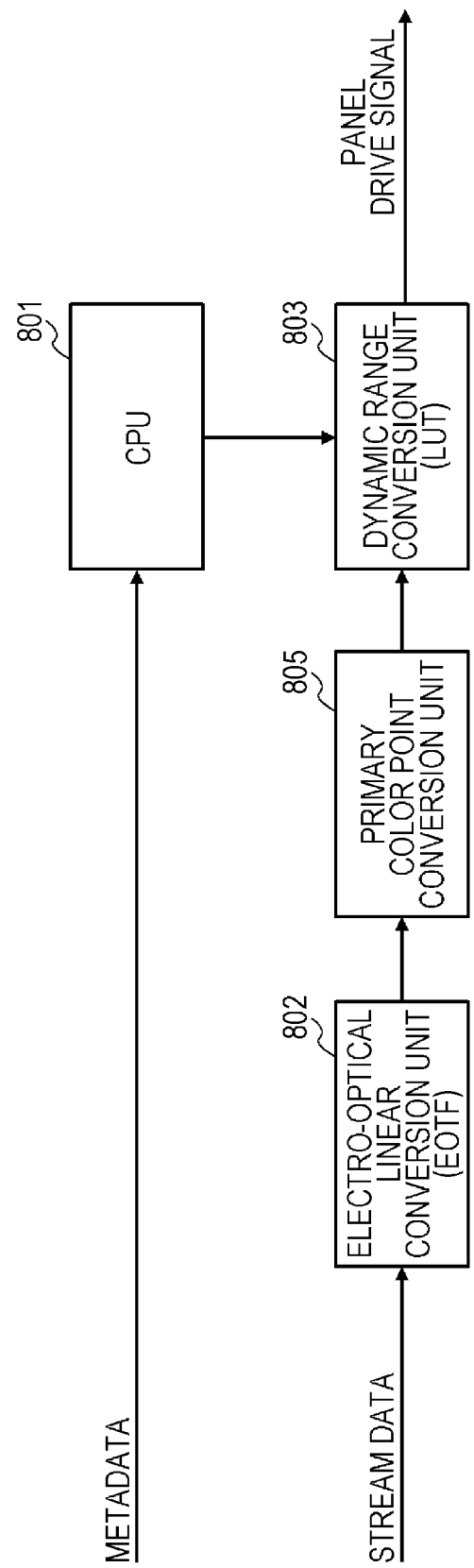
FIG. 10 is a diagram illustrating a modification of the processing blocks shown in FIG. 9.

FIG. 10 shows a modification of the processing blocks shown in FIG. 9. In FIG. 10, a primary color point conversion unit (Color Primary Converter) 805 is interposed between the electro-optical linear conversion unit 802 and the dynamic range conversion unit 803. When the color gamut of an input signal (stream data) is different from the panel color gamut of the display unit 304, it is necessary to provide the primary color point conversion unit 805 downstream of the electro-optical linear conversion unit 802 as illustrated to perform primary color point conversion on a light-beam-form luminance signal.

Figure 11:
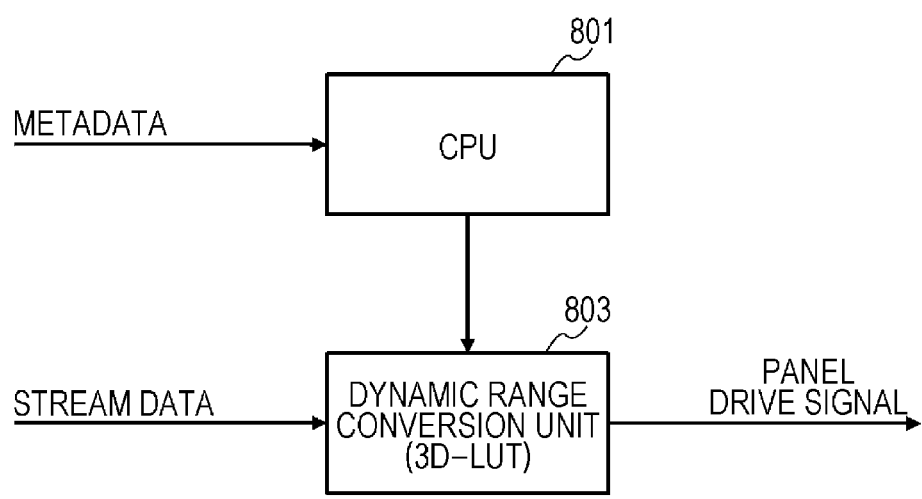
FIG. 11 is a diagram illustrating another modification of the processing blocks shown in FIG. 8.

FIG. 11 shows another modification of the processing blocks shown in FIG. 8. In an illustrated configuration example, a 3D-LUT is used in the dynamic range conversion unit 803, and conversion from stream data to a panel drive signal is directly performed.

In compression or extension of a dynamic range in display mapping, the image receiving apparatus 300 is expected, during compression or extension, to maintain luminance of luminance of interest and below and to maintain luminance of Diffuse white and below to some extent instead of linearly scaling the dynamic range.

Figure 12:
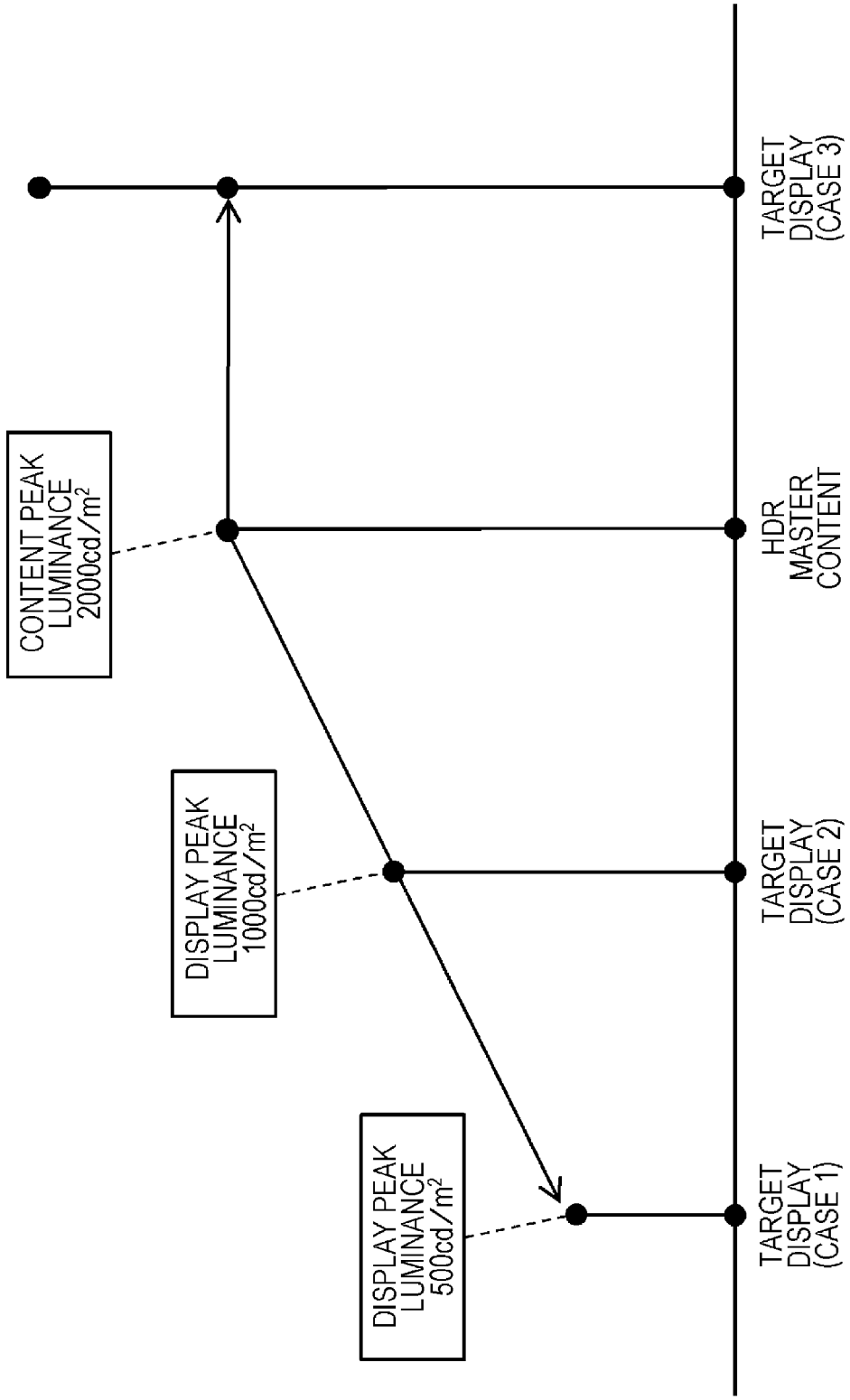
FIG. 12 is a diagram illustrating an example of display mapping HDR master content (provided that only content peak luminance is used).

FIG. 12 shows an example of display mapping HDR master content (provided that only content peak luminance is used). The figure shows together examples of display mapping HDR master content having certain content peak luminance to three types of current display having different peak luminance.

Assume that HDR master content to be processed has a content peak luminance of 2000 $cd/m^2$. These luminance information pieces are transmitted to the image receiving apparatus 300 in a transmission container such as knee_function_info SEI together with stream data.

A current display in Case 1 has its peak luminance of 500 $cd/m^2$, which is lower than the content peak luminance. Thus, display mapping is performed on the HDR master content to compress a luminance signal higher than or equal to the display peak luminance to the display peak luminance.

A current display in Case 2 has its peak luminance of 1000 $cd/m^2$, which is lower than the content peak luminance like the above. Thus, display mapping is performed on the HDR master content to compress a luminance signal higher than or equal to the display peak luminance to the display peak luminance.

A current display in Case 3 has its peak luminance of 3000 $cd/m^2$, which is higher than the peak luminance of the HDR master content. In this case, the luminance of the HDR master content is maintained at all luminance levels.

Figure 13:
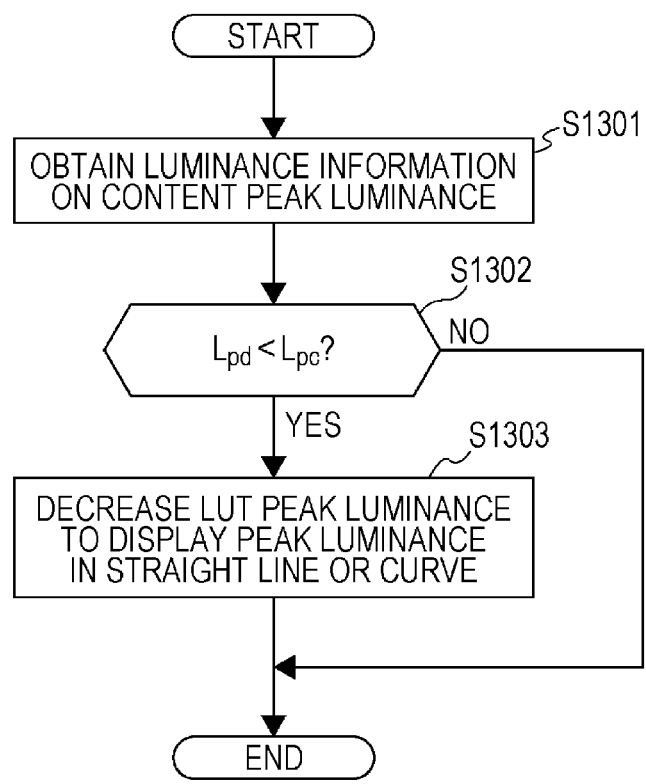
FIG. 13 is a flowchart showing an example of a processing operation in the processing blocks shown in FIGS. 8 to 11 (provided that only content peak luminance is used).

FIG. 13 shows an example of a processing operation (provided that only content peak luminance is used) in the processing blocks shown in FIGS. 8 to 11 in a flowchart form.

The CPU 801 obtains luminance information on content peak luminance from metadata (step S1301).

Then, the CPU 801 checks whether the peak luminance $L_{pd}$ of the display unit 304 (current display) is lower than the peak luminance $L_{pc}$ of the content (step S1302).

Figure 14:
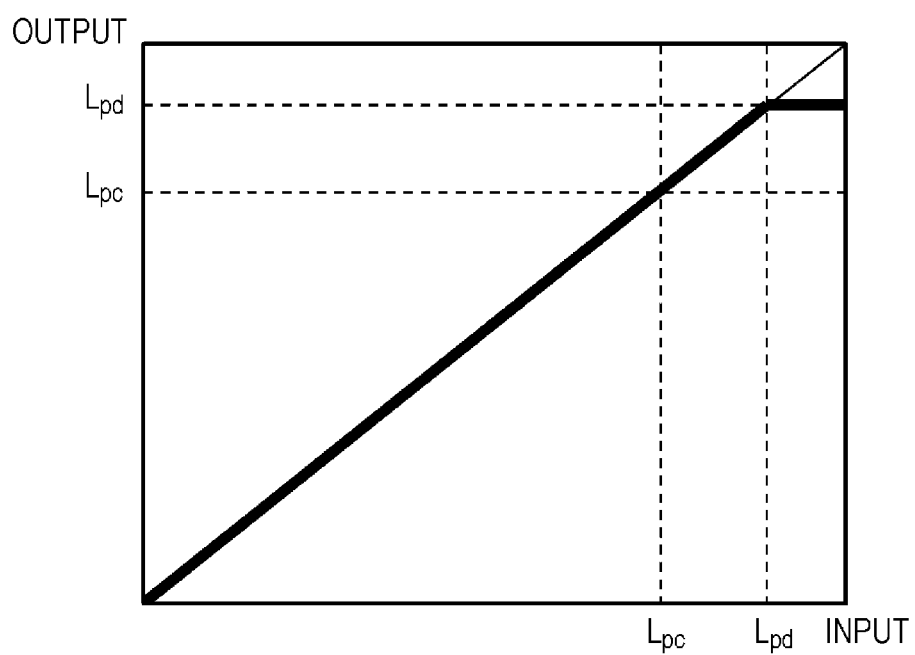
FIG. 14 is a graph showing an example of display mapping processing based on a processing procedure shown in FIG. 13.

Here, when the peak luminance $L_{pd}$ of the display unit 304 is higher than the peak luminance $L_{pc}$ of the content (No in step S1302), that is, when the peak luminance $L_{pc}$ of the content can be maintained in image display, the CPU 801 does not change the LUT in the dynamic range conversion unit 803 as shown in FIG. 14.

Figure 15A:
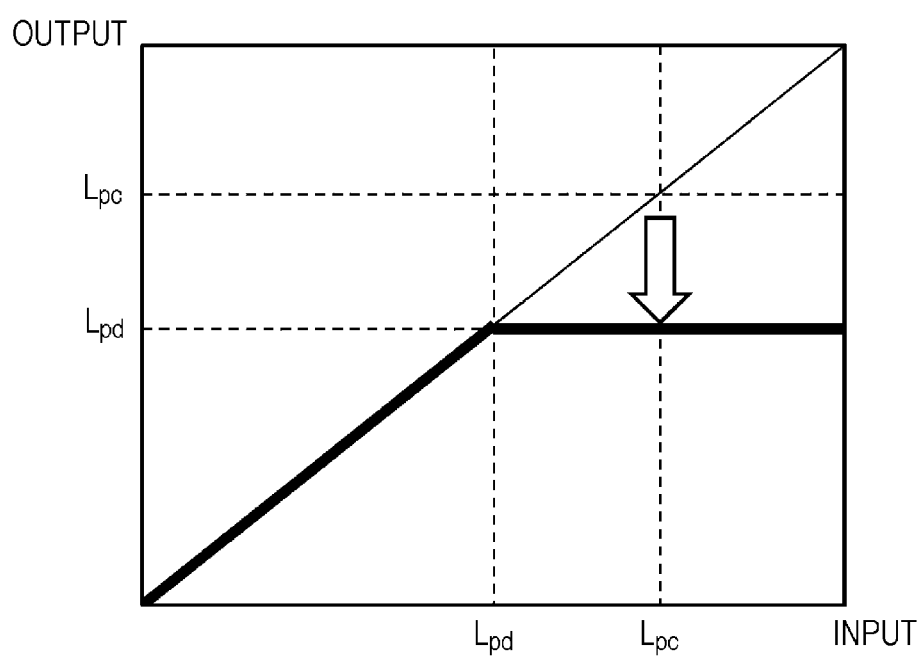
FIG. 15A is a graph showing an example of display mapping processing based on the processing procedure shown in FIG. 13.
Figure 15B:
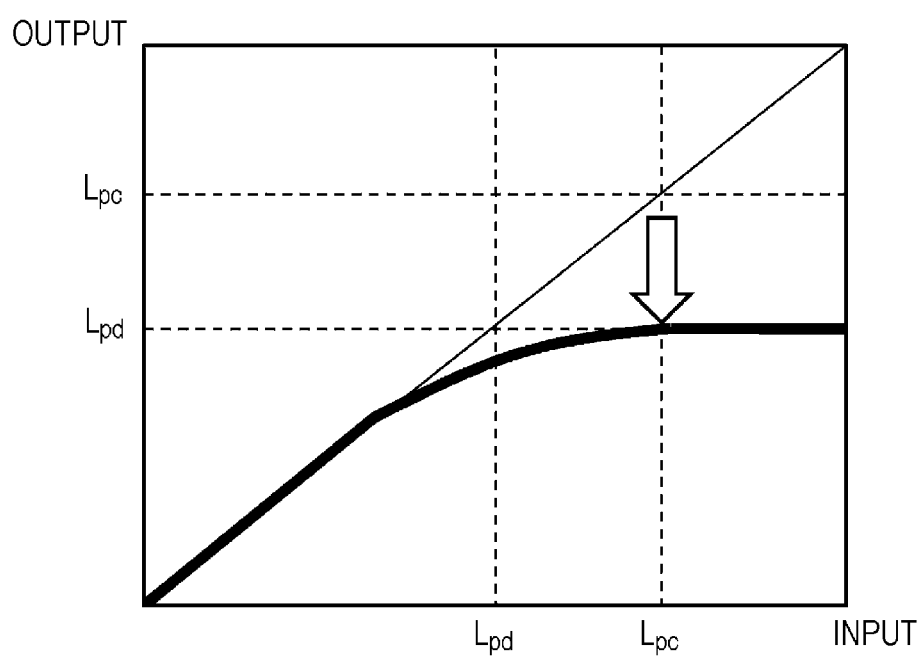
FIG. 15B is a graph showing an example of display mapping processing based on the processing procedure shown in FIG. 13.

On the other hand, when the peak luminance $L_{pd}$ of the display unit 304 is lower than the peak luminance $L_{pc}$ of the content (Yes in step S1302), that is, when the peak luminance $L_{pc}$ of the content cannot be maintained in image display, the CPU 801 decreases the peak luminance of the LUT in the dynamic range conversion unit 803 to the peak luminance $L_{pd}$ of the display unit 304 (step S1303). For example, as shown in FIG. 15A, the peak luminance of the LUT is decreased in a straight line to the peak luminance $L_{pd}$ of the display unit 304, or as shown in FIG. 15B, the peak luminance of the LUT is decreased in a curve to the peak luminance $L_{pd}$ of the display unit 304.

Figure 23:
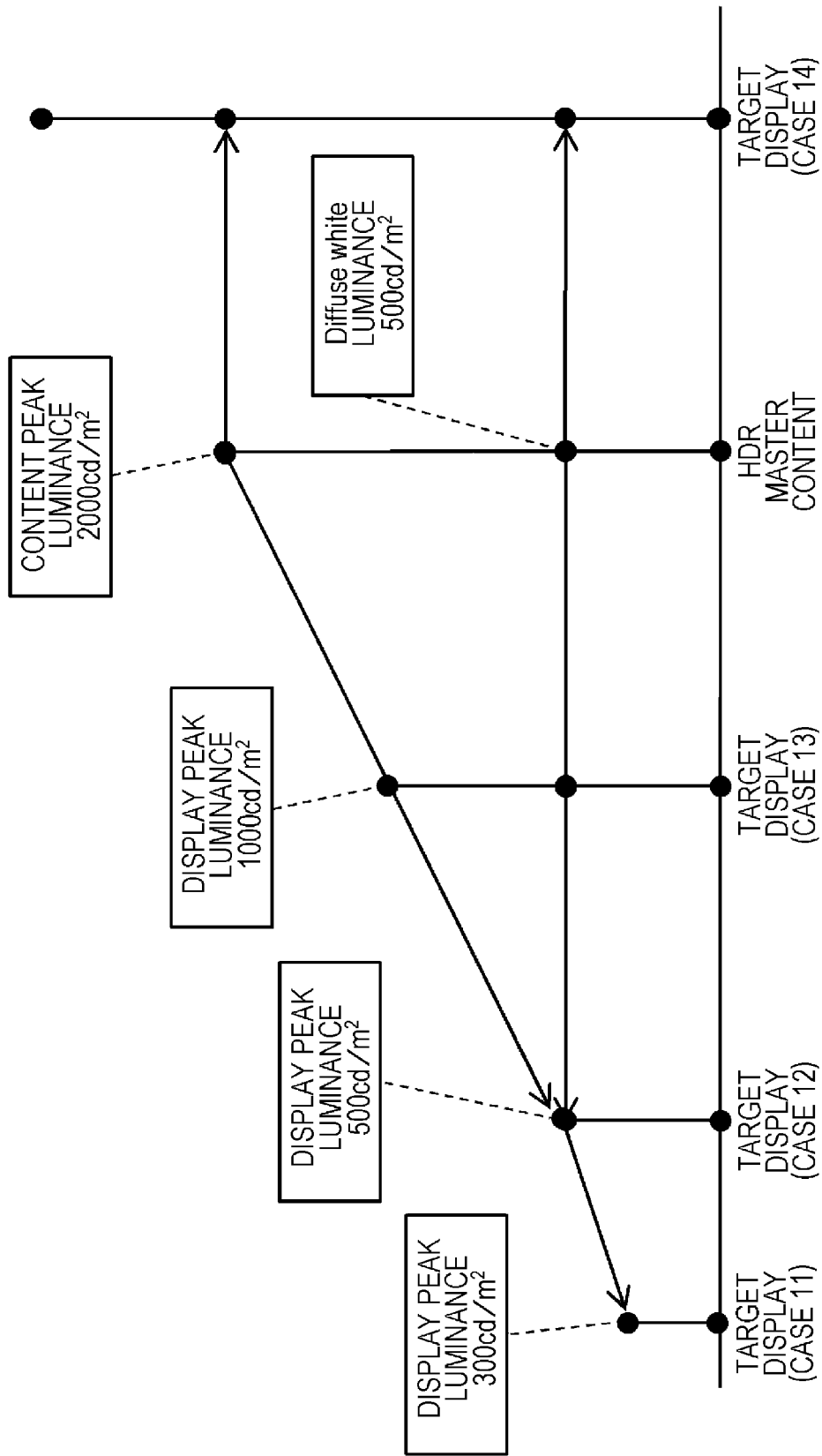
FIG. 23 is a diagram showing an example of display mapping HDR master content (provided that content peak luminance and Diffuse white luminance are used).

FIG. 23 shows an example of display mapping HDR master content (provided that content peak luminance and Diffuse white luminance are used). The figure shows together examples of display mapping HDR master content having certain content peak luminance and Diffuse white luminance to four types of current display having different peak luminance.

Assume that HDR master content to be processed has a content peak luminance of 2000 cd/m² and a Diffuse white luminance of 500 cd/m². These luminance information pieces are transmitted to the image receiving apparatus 300 in a transmission container such as knee_function_info SEI together with stream data (described above).

A current display in Case 11 has its peak luminance of 300 cd/m², which is lower than the Diffuse white luminance of the HDR master content. Thus, display mapping is performed on the HDR master content to compress a luminance signal higher than or equal to the display peak luminance to the display peak luminance.

A current display in Case 12 has its peak luminance of 500 cd/m², which agrees with the Diffuse white luminance of the HDR master content. Thus, display mapping is performed on the HDR master content to compress a luminance signal higher than or equal to the Diffuse white luminance to the display peak luminance while maintaining luminance levels lower than or equal to the Diffuse white luminance (or completely maintaining luminance lower than or equal to luminance of interest, and maintaining luminance from the luminance of interest to the Diffuse white luminance to some extent).

A current display in Case 13 has its peak luminance of 1000 cd/m², which is lower than the peak luminance of the HDR master content but is higher than the Diffuse white luminance. Thus, display mapping is performed on the HDR master content to compress a luminance signal higher than or equal to the Diffuse white luminance to the display peak luminance while maintaining luminance levels lower than or equal to the Diffuse white luminance (or completely maintaining luminance lower than or equal to luminance of interest, and maintaining luminance from the luminance of interest to the Diffuse white luminance to some extent).

A current display in Case 14 has its peak luminance of 3000 cd/m², which is higher than the peak luminance of the HDR master content. In this case, the luminance of the HDR master content is maintained at all luminance levels. Alternatively, display mapping is performed on the HDR master content to extend a luminance signal higher than or equal to the Diffuse white luminance to the display peak luminance while maintaining luminance levels lower than or equal to the Diffuse white luminance (or completely maintaining luminance lower than or equal to luminance of interest, and maintaining luminance from the luminance of interest to the Diffuse white luminance to some extent).

Figure 16:
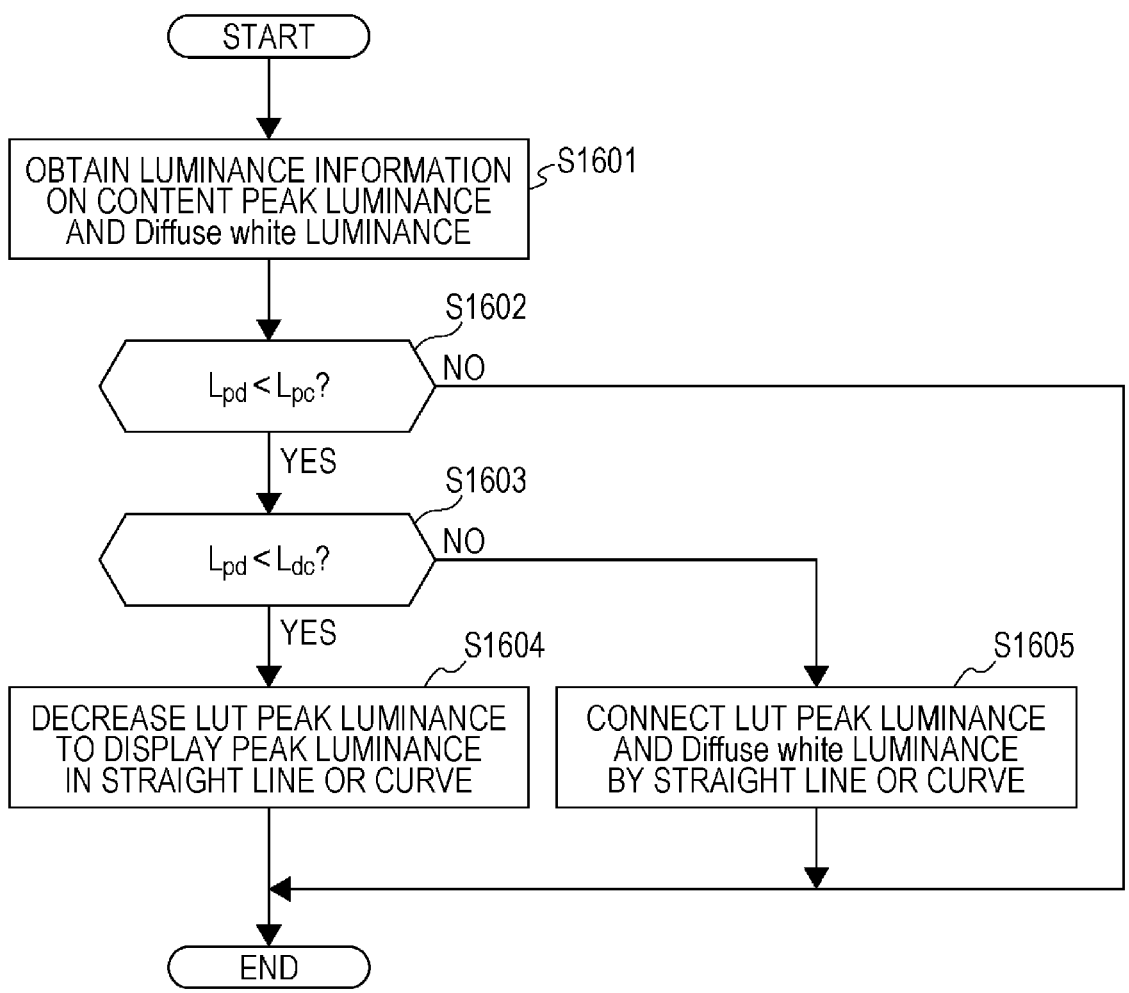
FIG. 16 is a flowchart showing another example of a processing operation in the processing blocks shown in FIGS. 8 to 11 (provided that content peak luminance and Diffuse white luminance are used).

FIG. 16 shows another example of a processing operation (provided that content peak luminance and Diffuse white luminance are used) in the processing blocks shown in FIGS. 8 to 11 in a flowchart form.

The CPU 801 obtains luminance information on content peak luminance and Diffuse white luminance from metadata (step S1601).

Then, the CPU 801 checks whether the peak luminance $L_{pd}$ of the display unit 304 (current display) is lower than the peak luminance $L_{pc}$ of the content (step S1602).

Here, when the peak luminance $L_{pd}$ of the display unit 304 is higher than the peak luminance $L_{pc}$ of the content (No in step S1602), that is, when the peak luminance $L_{pc}$ of the content can be maintained in image display, the CPU 801 does not change the LUT in the dynamic range conversion unit 803.

On the other hand, when the peak luminance $L_{pd}$ of the display unit 304 is lower than the peak luminance $L_{pc}$ of the content (Yes in step S1602), that is, when the peak luminance $L_{pc}$ of the content cannot be maintained in image display, the CPU 801 further checks whether the peak luminance $L_{pd}$ of the display unit 304 is lower than the Diffuse white luminance $L_{dc}$ of the content (step S1603).

Figure 17:
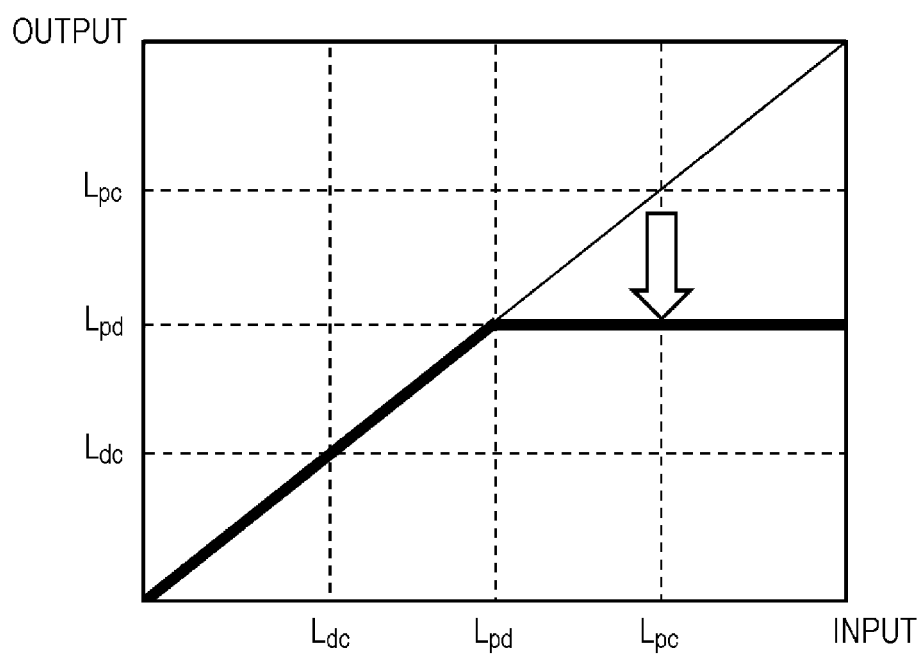
FIG. 17 is a graph showing an example of display mapping processing based on a processing procedure shown in FIG. 16.
Figure 18:
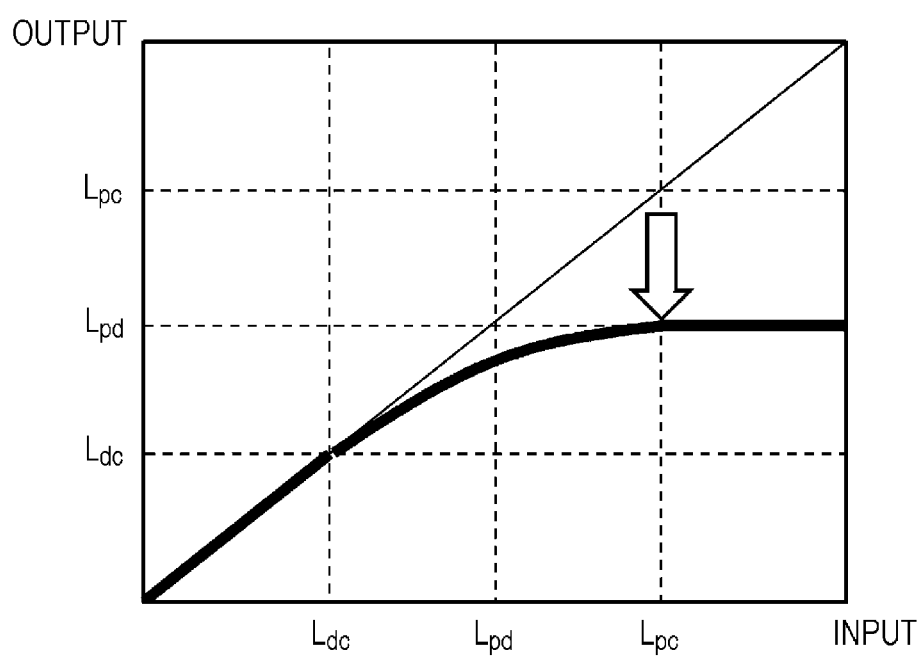
FIG. 18 is a graph showing an example of display mapping processing based on the processing procedure shown in FIG. 16.

Here, when the peak luminance $L_{pd}$ of the display unit 304 is higher than the Diffuse white luminance $L_{dc}$ of the content (No in step S1603), that is, when the Diffuse white luminance $L_{dc}$ of the content can be maintained in image display, the CPU 801 connects the peak luminance and the Diffuse white luminance of the LUT in the dynamic range conversion unit 803 (step S1605). For example, as shown in FIG. 17, the peak luminance and the Diffuse white luminance of the LUT are connected by a straight line, or as shown in FIG. 18, the peak luminance and the Diffuse white luminance of the LUT are connected by a curve such as a log curve.

Figure 24:
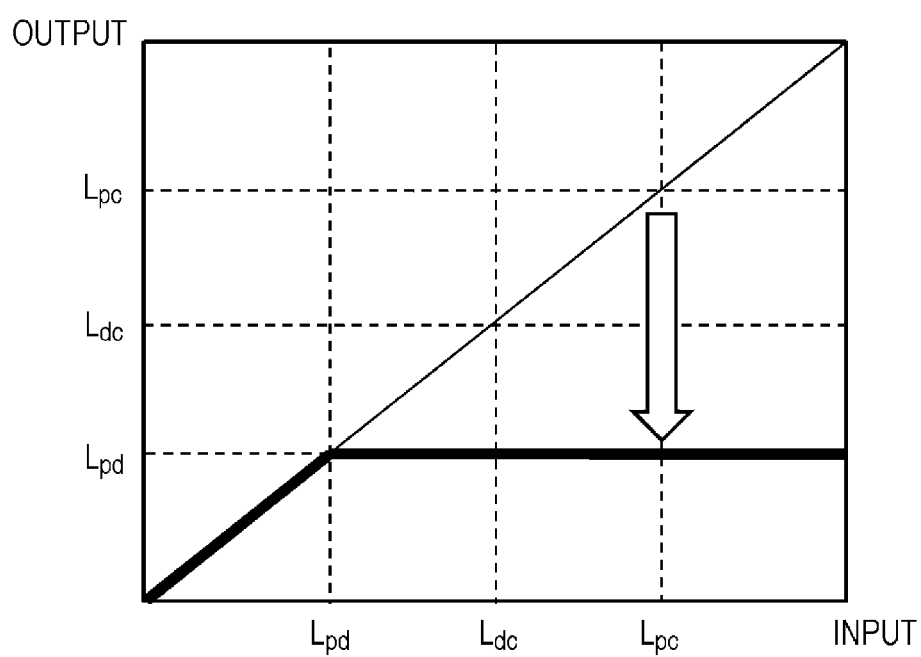
FIG. 24 is a graph showing an example of display mapping processing based on the processing procedure shown in FIG. 16.
Figure 25:
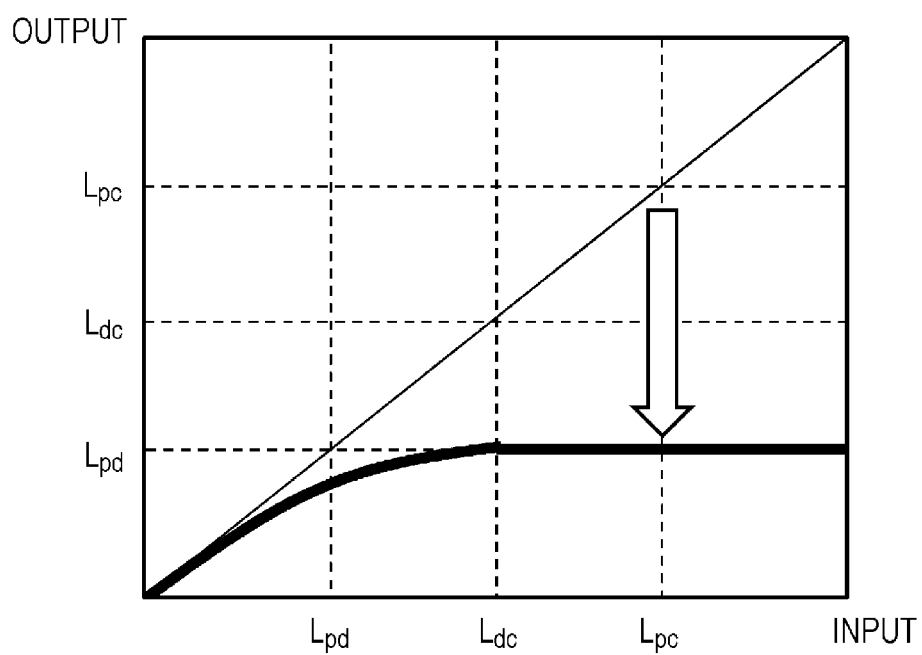
FIG. 25 is a graph showing an example of display mapping processing based on the processing procedure shown in FIG. 16.

On the other hand, when the peak luminance $L_{pd}$ of the display unit 304 is lower than the Diffuse white luminance $L_{dc}$ of the content (Yes in step S1603), that is, when the Diffuse white luminance $L_{dc}$ of the content cannot be maintained in image display, the CPU 801 decreases the peak luminance of the LUT in the dynamic range conversion unit 803 to the peak luminance $L_{pd}$ of the display unit 304 (step S1604). For example, as shown in FIG. 24, the peak luminance of the LUT is decreased in a straight line to the peak luminance $L_{pd}$ of the display unit 304, or as shown in FIG. 25, the peak luminance of the LUT is decreased in a curve to the peak luminance $L_{pd}$ of the display unit 304.

Figure 22:
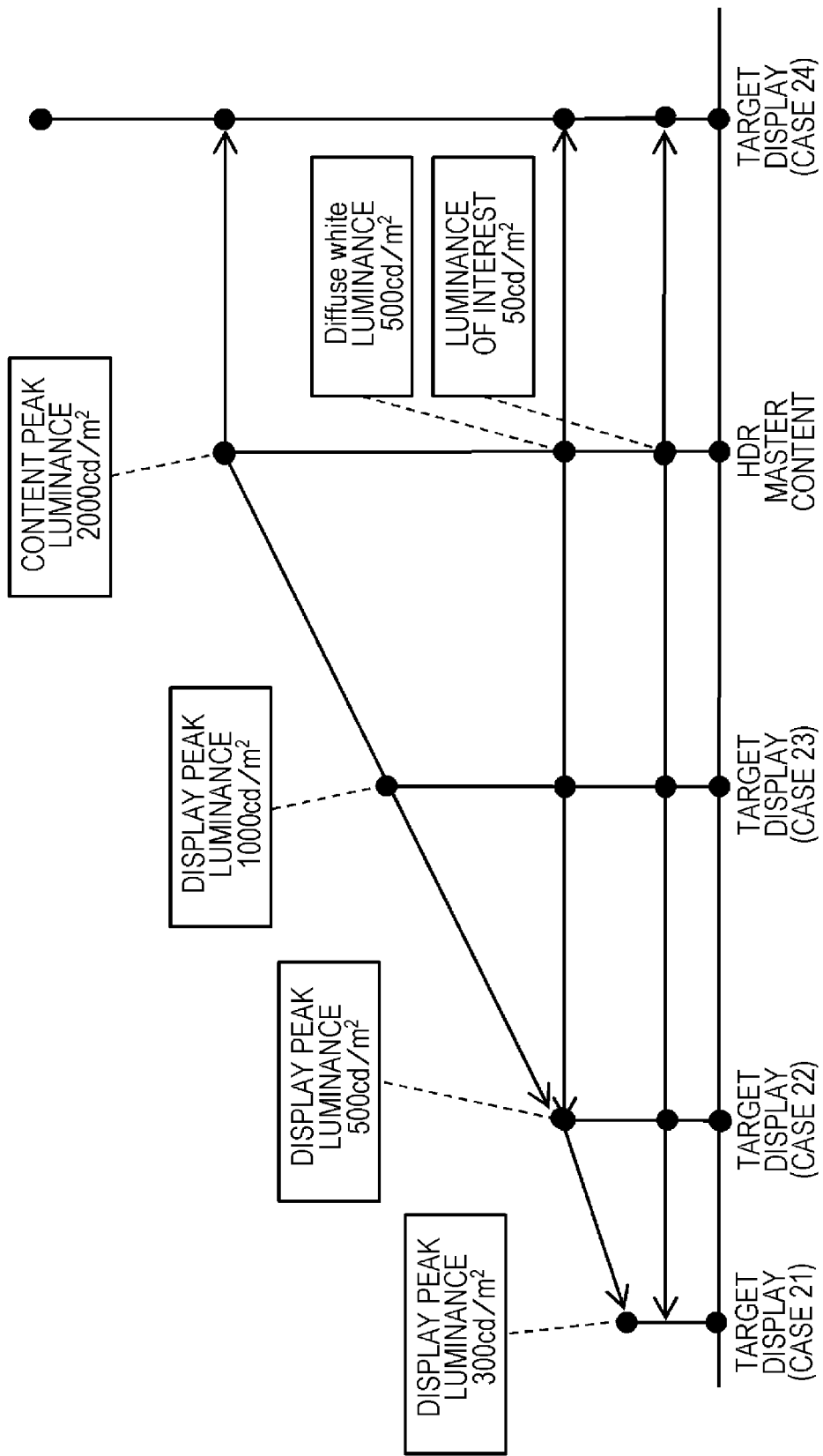
FIG. 22 is a diagram showing an example of display mapping HDR master content (provided that content peak luminance, Diffuse white luminance, and luminance of interest are used).

FIG. 22 shows an example of display mapping HDR master content (provided that content peak luminance, Diffuse white luminance, and luminance of interest are used). The figure shows together examples of display mapping HDR master content having certain content peak luminance, Diffuse white luminance, and luminance of interest to four types of current display having different peak luminance.

Assume that HDR master content to be processed has a content peak luminance of 2000 cd/m², a Diffuse white luminance of 500 cd/m², and a luminance of interest of 50 cd/m². These luminance information pieces are transmitted to the image receiving apparatus 300 in a transmission container such as knee_function_info SEI together with stream data (described above).

A current display in Case 21 has its peak luminance of 300 cd/m², which is lower than the Diffuse white luminance of the HDR master content but is higher than the luminance of interest. Thus, display mapping is performed on the HDR master content to compress a luminance signal higher than or equal to the display peak luminance to the display peak luminance while maintaining luminance levels lower than or equal to the luminance of interest (or completely maintaining luminance lower than or equal to the luminance of interest, and maintaining luminance from the luminance of interest to the Diffuse white luminance to some extent).

A current display in Case 22 has its peak luminance of 500 cd/m², which agrees with the Diffuse white luminance of the HDR master content. Thus, display mapping is performed on the HDR master content to compress a luminance signal higher than or equal to the Diffuse white luminance to the display peak luminance while maintaining luminance levels lower than or equal to the Diffuse white luminance (or completely maintaining luminance lower than or equal to the luminance of interest, and maintaining luminance from the luminance of interest to the Diffuse white luminance to some extent).

A current display in Case 23 has its peak luminance of 1000 cd/m², which is lower than the peak luminance of the HDR master content but is higher than the Diffuse white luminance. Thus, display mapping is performed on the HDR master content to compress a luminance signal higher than or equal to the Diffuse white luminance to the display peak luminance while maintaining luminance levels lower than or equal to the Diffuse white luminance (or completely maintaining luminance lower than or equal to the luminance of interest, and maintaining luminance from the luminance of interest to the Diffuse white luminance to some extent).

A current display in Case 24 has its peak luminance of 3000 cd/m$^2$, which is higher than the peak luminance of the HDR master content. In this case, the luminance of the HDR master content is maintained at all luminance levels. Alternatively, display mapping is performed on the HDR master content to extend a luminance signal higher than or equal to the Diffuse white luminance to the display peak luminance while maintaining luminance levels lower than or equal to the Diffuse white luminance (or completely maintaining luminance lower than or equal to the luminance of interest, and maintaining luminance from the luminance of interest to the Diffuse white luminance to some extent).

Figure 19:
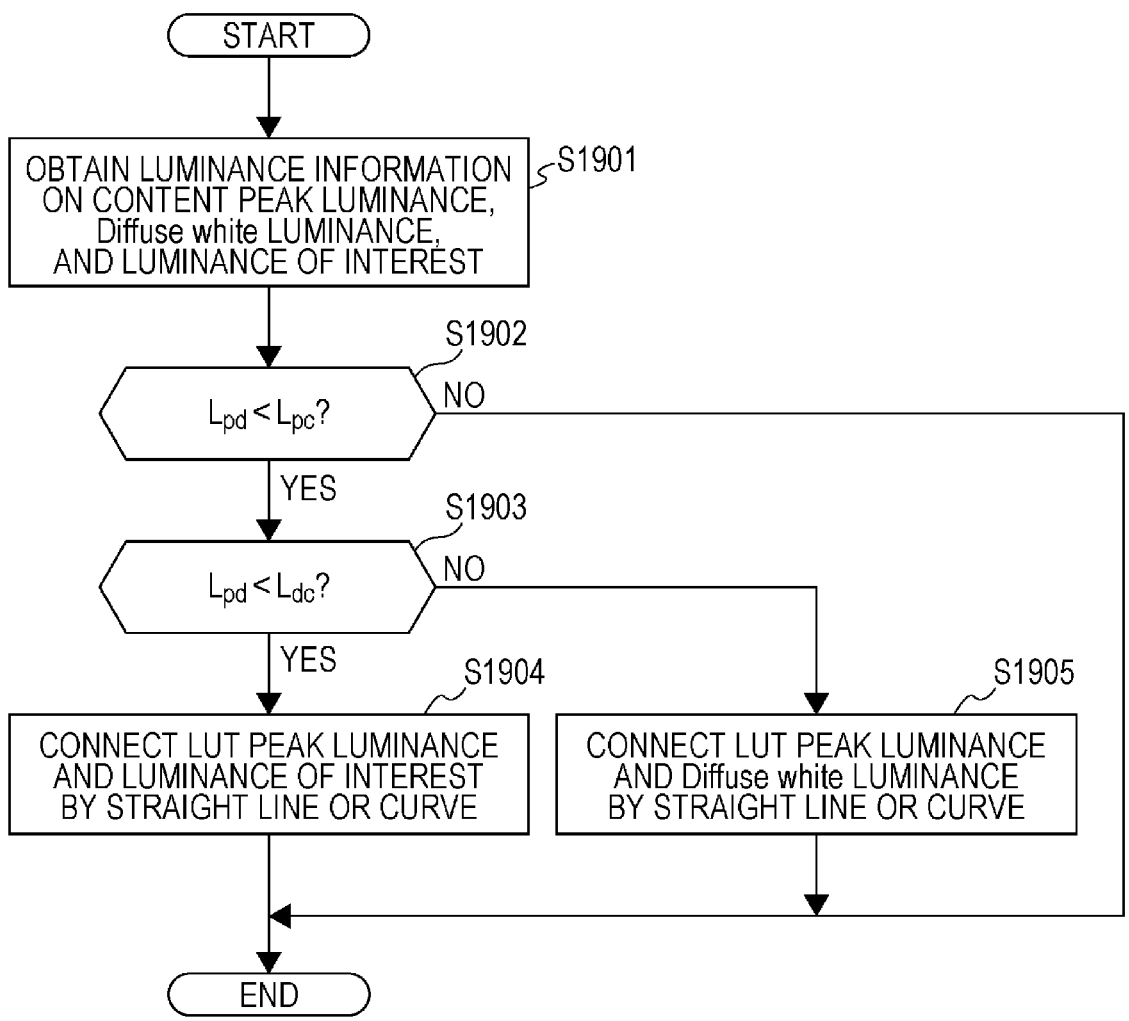
FIG. 19 is a flowchart showing still another example of a processing operation in the processing blocks shown in FIGS. 8 to 11 (provided that content peak luminance, Diffuse white luminance, and luminance of interest are used).

FIG. 19 shows still another example of a processing operation (provided that content peak luminance, Diffuse white luminance, and luminance of interest are used) in the processing blocks shown in FIGS. 8 to 11 in a flowchart form.

The CPU 801 obtains luminance information on content peak luminance, Diffuse white luminance, and luminance of interest from metadata (step S1901).

Then, the CPU 801 checks whether the peak luminance $L_{pd}$ of the display unit 304 (target display) is lower than the peak luminance $L_{pc}$ of the content (step S1902).

Here, when the peak luminance $L_{pd}$ of the display unit 304 is higher than the peak luminance $L_{pc}$ of the content (No in step S1902), that is, when the peak luminance $L_{pc}$ of the content can be maintained in image display, the CPU 801 does not change the LUT in the dynamic range conversion unit 803.

On the other hand, when the peak luminance $L_{pd}$ of the display unit 304 is lower than the peak luminance $L_{pc}$ of the content (Yes in step S1902), that is, when the peak luminance $L_{pc}$ of the content cannot be maintained in image display, the CPU 801 further checks whether the peak luminance $L_{pd}$ of the display unit 304 is lower than the Diffuse white luminance $L_{dc}$ of the content (step S1903).

Figure 26:
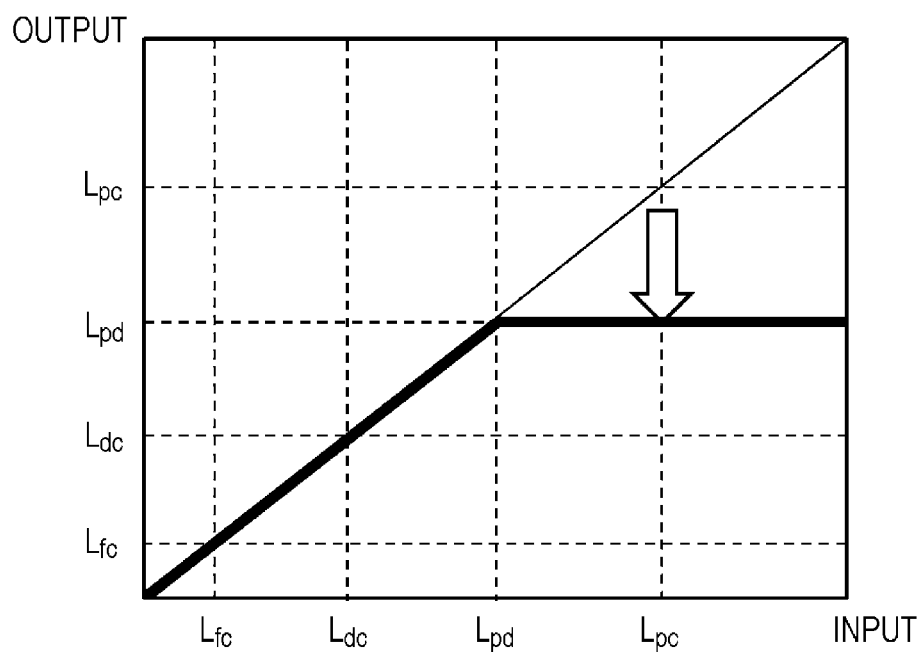
FIG. 26 is a graph showing an example of display mapping processing based on the processing procedure shown in FIG. 19.
Figure 27:
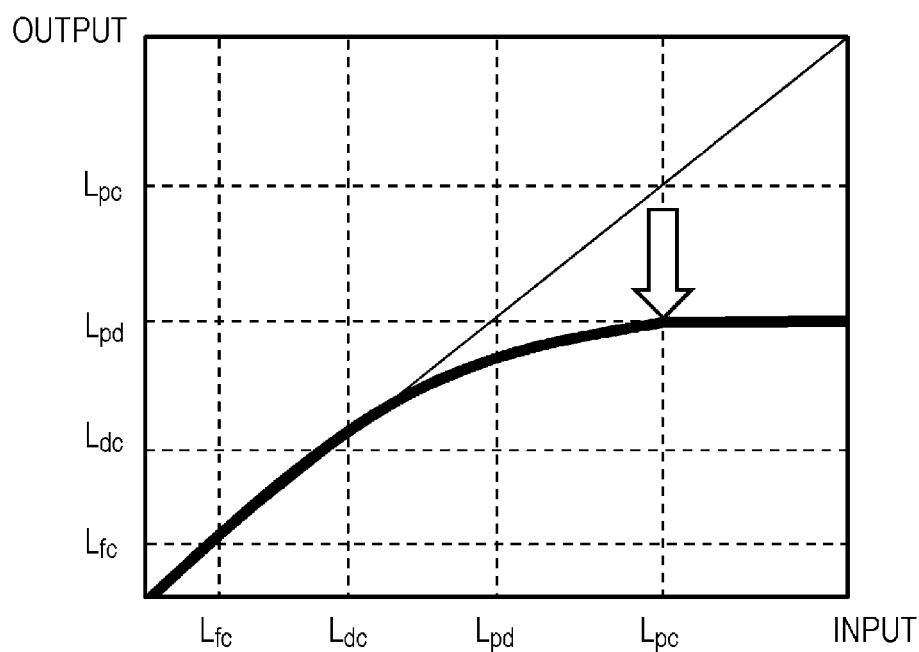
FIG. 27 is a graph showing an example of display mapping processing based on the processing procedure shown in FIG. 19.

Here, when the peak luminance $L_{pd}$ of the display unit 304 is higher than the Diffuse white luminance $L_{dc}$ of the content (No in step S1903), that is, when the Diffuse white luminance $L_{dc}$ of the content can be maintained in image display, the CPU 801 connects the peak luminance and the Diffuse white luminance of the LUT in the dynamic range conversion unit 803 (step S1905). For example, as shown in FIG. 26, the peak luminance and the Diffuse white luminance of the LUT are connected by a straight line, or as shown in FIG. 27, the peak luminance and the Diffuse white luminance of the LUT are connected by a curve such as a log curve.

Figure 20:
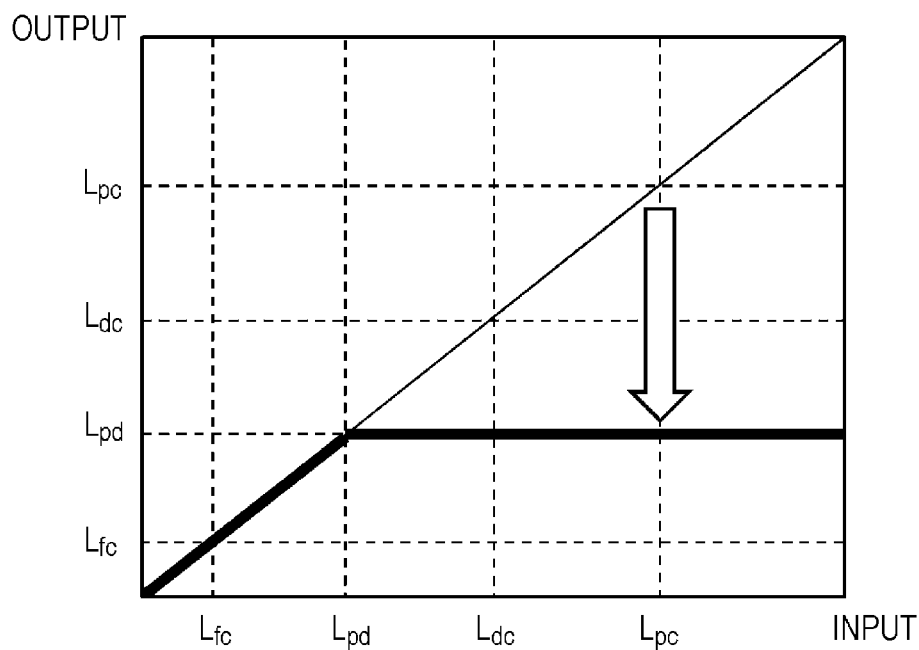
FIG. 20 is a graph showing an example of display mapping processing based on a processing procedure shown in FIG. 19.
Figure 21:
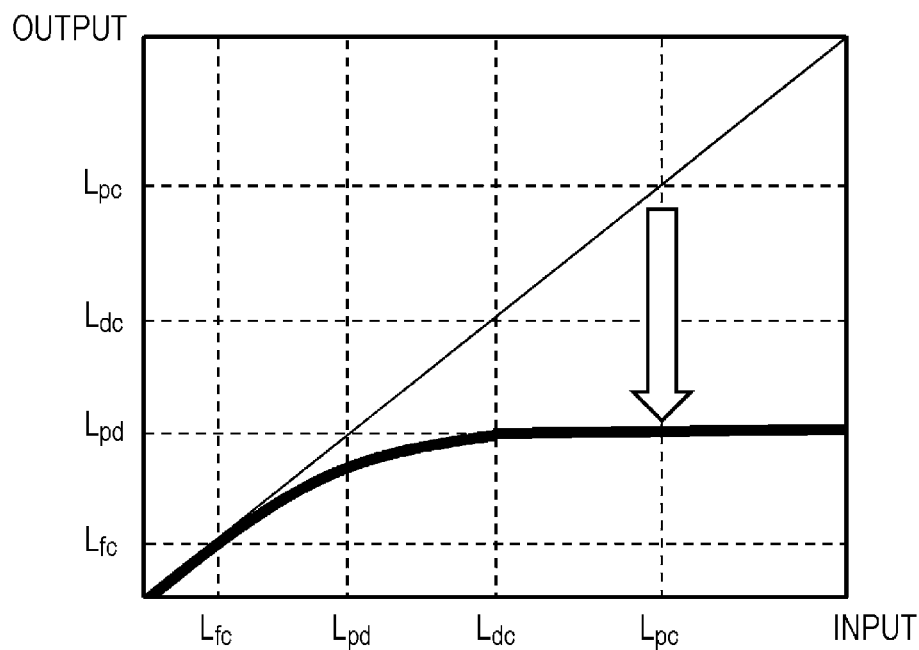
FIG. 21 is a graph showing an example of display mapping processing based on the processing procedure shown in FIG. 19.

On the other hand, when the peak luminance $L_{pd}$ of the display unit 304 is lower than the Diffuse white luminance $L_{dc}$ of the content (Yes in step S1903), that is, when the Diffuse white luminance $L_{dc}$ of the content cannot be maintained in image display, the CPU 801 connects the peak luminance and the luminance of interest $L_{fc}$ of the LUT in the dynamic range conversion unit 803 (step S1904). For example, as shown in FIG. 20, the peak luminance and the luminance of interest $L_{fc}$ of the LUT are connected by a straight line, or as shown in FIG. 21, the peak luminance and the luminance of interest $L_{fc}$ of the LUT are connected by a curve such as a log curve.

INDUSTRIAL APPLICABILITY

The technology disclosed in this specification has been described in detail with reference to a specific embodiment above. However, it is obvious that those skilled in the art can modify or replace the embodiment without departing from the gist of the technology disclosed in this specification.

In this specification, description has been made mainly of the embodiment applied to an image transmission system in which HDR content is transmitted, such as an Internet distribution service such as OTT, a digital broadcast service, and UHD-BD, but the gist of the technology disclosed in this specification is not limited to this. The technology disclosed in this specification can be applied to various systems in which HDR content is transmitted or displayed.

In short, the technology disclosed in this specification has been described through the form of illustration, and the described contents in this specification should not be construed as limiting. To determine the gist of the technology disclosed in this specification, the scope of the claims should be taken into consideration.

The present technology may also be configured as below.

(1) An image processing apparatus including:

circuitry configured to: receive image data; and receive metadata set based on the image data, the metadata including information serving as a display mapping reference to maintain a characteristic of the image data to a portion of the image data.

(2) The apparatus according to (1) further including:

a display; and wherein the circuitry is configured to perform display mapping of the image data based on the metadata.

(3) The apparatus according to (1) or (2), wherein the circuitry is configured to: receive, as the metadata, the information serving as the display mapping reference in each scene, in which the information serving as the display mapping reference includes at least one of (i) Diffuse white information that indicates a white luminance value serving as a reference in the image data or (ii) information on luminance of interest that indicates a luminance value of a central object or an object of interest in the image data; and perform the display mapping of the image data so that luminance indicated by the Diffuse white information or the luminance of interest is maintained.

(4) The apparatus according to any one of (1) to (3), wherein the circuitry is configured to: receive information on peak luminance of the image data as the metadata; and compress the peak luminance of the image data to peak luminance of the display when the peak luminance of the image data is higher than the peak luminance of the display.

(5) The apparatus according to any one of (1) to (4), wherein the circuitry is configured to: receive, as the metadata, information on peak luminance of the image data and the information serving as the display mapping reference which includes information on Diffuse white information that indicates a white luminance value serving as a reference in the image data; and compress the peak luminance of the image data to peak luminance of the display, and compress luminance from the peak luminance to luminance indicated by the Diffuse white information linearly or nonlinearly when the peak luminance of the image data is higher than the peak luminance of the display.

(6) The image processing apparatus according to any one of (1) to (5), wherein the circuitry is configured to: receive, as the metadata, information on peak luminance of the image data and the information serving as the display mapping reference which includes information on luminance of interest that indicates a luminance value of a central object or an object of interest in the image data; and compress the peak luminance of the image data to peak luminance of the display, and compress luminance from the peak luminance to the luminance of interest linearly or nonlinearly when the peak luminance of the image data is higher than the peak luminance of the display.

(7) The image processing apparatus according to any one of (1) to (6), wherein the circuitry is configured to: receive, as the metadata, information on peak luminance of the image data and the information serving as the display mapping reference which includes at least one of (i) Diffuse white information that indicates a white luminance value serving as a reference in the image data or (ii) information on luminance of interest that indicates a luminance value of a central object or an object of interest in the image data; and compress the peak luminance of the image data to peak luminance of the display, and compress luminance from the peak luminance to the luminance of interest linearly or nonlinearly when luminance indicated by the Diffuse white information is higher than the peak luminance of the display.

(8) An image processing method including:

an image receiving step of receiving image data; and a metadata receiving step of receiving metadata set based on the image data, the metadata including information serving as a display mapping reference to maintain a characteristic of the image data to a portion of the image data.

(9) An image processing method according to (8), wherein the information serving as the display mapping reference includes at least one of (i) Diffuse white information that indicates a white luminance value serving as a reference in the image data or (ii) information on luminance of interest that indicates a luminance value of a central object or an object of interest in the image data.

(10) An image processing apparatus including:

circuitry configured to: transmit image data; and transmit metadata set based on the image data, the metadata including information serving as a display mapping reference to maintain a characteristic of the image data to a portion of the image data.

(11) An image processing method according to (10), wherein the circuitry includes, in the metadata, as the information serving as the display mapping reference, at least one of (i) Diffuse white information that indicates a white luminance value serving as a reference in the image data transmitted from the image transmitting unit or (ii) information on luminance of interest that indicates a luminance value of a central object or an object of interest in the image data transmitted, and transmits the metadata.

(12) An image processing method according to (10) or (11), wherein the circuitry includes, in the metadata, information on peak luminance in the image data transmitted, and transmits the metadata.

(13) An image processing method according to any of (10) to (12), wherein the information serving as the display mapping reference is for use in display mapping.

(14) An image processing method including:

an image transmitting step of transmitting image data; and a metadata transmitting step of transmitting metadata set based on the image data, the metadata including luminance information serving as a display mapping reference to maintain a characteristic of the image data to a portion of the image data.

(15) An image processing apparatus including:

circuitry configured to: transmit image data; and transmit metadata set based on the image data, the metadata including information serving as a display mapping reference to maintain the image data to reflect a predetermined intention of a content producer or supplier.

The technology disclosed in this specification can also take the following configuration.

(1) An image processing apparatus including:

an image transmitting unit that transmits image data; and a metadata transmitting unit that transmits metadata set based on the image data, the metadata including luminance information useful in display mapping.

(1-1) The image processing apparatus according to (1), in which the metadata transmitting unit stores the metadata in knee_function_info SEI of the image data.

(1-2) The image processing apparatus according to (1), in which the metadata transmitting unit stores the metadata in a database file of Blu-ray Disc in which the image data is recorded.

(2) The image processing apparatus according to (1), wherein the metadata transmitting unit includes, in the metadata, information on Diffuse white luminance that represents a white luminance value serving as a reference in the image data transmitted from the image transmitting unit, and transmits the metadata.

(3) The image processing apparatus according to (1), wherein the metadata transmitting unit includes, in the metadata, information on luminance of interest that represents a luminance value of a central object or an object of interest in the image data (in each scene) transmitted from the image transmitting unit, and transmits the metadata.

(4) The image processing apparatus according to (1), wherein the metadata transmitting unit includes, in the metadata, information on peak luminance in the image data transmitted from the image transmitting unit, and transmits the metadata.

(5) An image processing method including:

an image transmitting step of transmitting image data; and a metadata transmitting step of transmitting metadata set based on the image data, the metadata including luminance information useful in display mapping.

(6) An image processing apparatus including:

an image receiving unit that receives image data; and a metadata receiving unit that receives metadata set based on the image data, the metadata including luminance information useful in display mapping.

(6-1) The image processing apparatus according to (6), in which the metadata receiving unit receives the metadata from knee_function_info SEI of the image data.

(6-2) The image processing apparatus according to (6), in which the metadata receiving unit receives the metadata from a database file of Blu-ray Disc in which the image data is recorded.

(7) The image processing apparatus according to (6), further including:

a display unit; and a display mapping processing unit that performs display mapping of the image data based on the metadata.

(8) The image processing apparatus according to (7), wherein the metadata receiving unit receives, as the metadata, at least one information of Diffuse white luminance that represents a white luminance value serving as a reference in the image data and luminance of interest that represents a luminance value of a central object or an object of interest in the image data (in each scene); and the display mapping processing unit performs the display mapping of the image data so that the Diffuse white luminance or the luminance of interest is maintained.

(9) The image processing apparatus according to (7), wherein the metadata receiving unit receives information on peak luminance of the image data as the metadata; and the display mapping processing unit compresses the peak luminance of the image data to peak luminance of the display unit when the peak luminance of the image data is higher than the peak luminance of the display unit.

(10) The image processing apparatus according to (7), wherein the metadata receiving unit receives, as the metadata, information on peak luminance of the image data and information on Diffuse white luminance that represents a white luminance value serving as a reference in the image data; and the display mapping processing unit compresses the peak luminance of the image data to peak luminance of the display unit and compresses luminance from the peak luminance to the Diffuse white luminance linearly or nonlinearly when the peak luminance of the image data is higher than the peak luminance of the display unit.

(11) The image processing apparatus according to (7), wherein the metadata receiving unit receives, as the metadata, information on peak luminance of the image data and information on luminance of interest that represents a luminance value of a central object or an object of interest in the image data; and the display mapping processing unit compresses the peak luminance of the image data to peak luminance of the display unit, and compresses luminance from the peak luminance to the luminance of interest linearly or nonlinearly when the peak luminance of the image data is higher than the peak luminance of the display unit.

(12) The image processing apparatus according to (7), wherein the metadata receiving unit receives, as the metadata, information on peak luminance of the image data, information on Diffuse white luminance that represents a white luminance value serving as a reference in the image data, and information on luminance of interest that represents a luminance value of a central object or an object of interest in the image data; and the display mapping processing unit compresses the peak luminance of the image data to peak luminance of the display unit, and compresses luminance from the peak luminance to the luminance of interest linearly or nonlinearly when the Diffuse white luminance is higher than the peak luminance of the display unit.

(13) An image processing method including:

an image receiving step of receiving image data; and a metadata receiving step of receiving metadata set based on the image data, the metadata including luminance information useful in display mapping.

REFERENCE SIGNS LIST

100 Image transmission system
200 Image transmitting apparatus
201 Imaging unit
202 Grading/mastering unit
203 Optical-electro conversion unit
300 Image receiving apparatus
301 Decoding unit
302 Electro-optical linear conversion unit
303 Linear display gamma conversion unit
304 Display unit
801 CPU
802 Electro-optical linear conversion unit
803 Dynamic range conversion unit
804 Optical-electro conversion unit
805 Primary color point conversion unit

The invention claimed is:

1. An image processing apparatus comprising:
   circuitry configured to:
      receive image data; and
      receive metadata set based on the image data, the metadata including luminance point information serving as a display mapping reference, wherein the luminance point information includes at least:
         (i) a first luminance value indicating a peak luminance of the image data;
         (ii) a second luminance value indicating a diffuse white luminance of the image data serving as a reference in the image data; and
         (iii) a third luminance value indicating a luminance of interest corresponding to a central object or an object of interest in the image data,
      wherein each of the first luminance value, the second luminance value and the third luminance value is a dynamic value that varies from image to image or from scene to scene; and
      determine whether the first luminance value of the image data is less than, equals, or exceeds a peak luminance of the display;
      if the first luminance value of the image data exceeds the peak luminance of the display, compress luminance values of the image data above the second luminance value using the luminance point information;
      if the first luminance value of the image data is less than the peak luminance of the display, extend the dynamic range of the image data so that the image data is adapted to a dynamic range of a display associated with the image processing apparatus,
      wherein, for image data having a third luminance value within the dynamic range of the display, luminance values of the image data at or below the third luminance value are maintained independent of the determination of the first luminance value of whether the image data exceeds the peak luminance of the dynamic range of the display.

2. The image processing apparatus according to claim 1, wherein the circuitry is configured to:
   compress the peak luminance of the image data to the peak luminance of the dynamic range of the display when the first luminance value of the image data is higher than the peak luminance of the dynamic range of the display.

3. The image processing apparatus according to claim 1, wherein the circuitry is configured to: compress luminance of the image data between the first and second luminance values linearly when the first luminance value of the image data is higher than the peak luminance of the dynamic range of the display.

4. The image processing apparatus according to claim 1, wherein the circuitry is configured to:
   compress luminance of the image data between the first and third luminance values linearly or nonlinearly when the first luminance value of the image data is higher than the peak luminance of the dynamic range of the display.

5. The image processing apparatus according to claim 1, wherein the circuitry is configured to:

compress luminance of the image data between the first and third luminance values linearly or nonlinearly when the second luminance value is higher than the peak luminance of the display.

6. The image processing apparatus according to claim 1, wherein the circuitry is configured to: compress luminance of the image data between the first and second luminance values nonlinearly when the first luminance value of the image data is higher than the peak luminance of the dynamic range of the display.

7. An image processing method comprising:
receiving image data;
receiving metadata set based on the image data, the metadata including luminance point information serving as a display mapping reference, the luminance point information includes at least:
  (i) a first luminance value indicating a peak luminance of the image data;
  (ii) a second luminance value indicating a diffuse white luminance of the image data serving as a reference in the image data; and
  (iii) a third luminance value indicating a luminance of interest corresponding to a central object or an object of interest in the image data,
wherein each of the first luminance value, the second luminance value and the third luminance value is a dynamic value that varies from image to image or from scene to scene; and
determining whether the first luminance value of the image data is less than, equals, or exceeds a peak luminance of the display;
if the first luminance value of the image data exceeds the peak luminance of the display, performing display mapping of the image data by compressing luminance values of the image data above the second luminance value using the luminance point information;
if the first luminance value of the image data is less than the peak luminance of the display, performing display mapping of the image data by extending the dynamic range of the image data so that the image data is adapted to a dynamic range for display;
wherein for image data having a third luminance value within the dynamic range for display, luminance values of the image data at or below the third luminance value are maintained independent of the determination of whether the first luminance value of the image data is less than, equals or exceeds the peak luminance of the display.

8. An image processing apparatus comprising:
circuitry configured to:
  transmit an image data; and
  transmit metadata set based on the image data, the metadata including luminance point information serving as a display mapping reference for the image data, wherein the luminance point information includes at least:
    (i) a first luminance value indicating a peak luminance of the image data;
    (ii) a second luminance value indicating a diffuse white luminance of the image data serving as a reference in the image data; and
    (iii) a third luminance value indicating a luminance of interest corresponding to a central object or an object of interest in the image data,
  wherein each of the first luminance value, the second luminance value and the third luminance value is a dynamic value that varies from image to image or from scene to scene;
wherein the circuitry is configured to transmit the metadata for use by a display device having a different dynamic range than a dynamic range of the image processing apparatus so that:
  if the first luminance value of the image data exceeds the peak luminance of the dynamic range of the display, the display device compresses luminance values of the image data above the second luminance value using the luminance point information;
  if the first luminance value of the image data is less than the peak luminance of dynamic range of the display, the display device extends the dynamic range of the image data so that the image data is adapted for display on the display device; and
  wherein if the third luminance value of the image data is within the dynamic range of the display, luminance values of the image data at or below the third luminance value are maintained independent of whether the first luminance value of the image data is within the dynamic range of the display.

9. The image processing according to claim 8, wherein the information serving as the display mapping reference is for use in display mapping at an image receiving apparatus.

10. An image processing method comprising:
transmitting image data; and
transmitting metadata set based on the image data, the metadata including luminance point information serving as a display mapping reference for the image data, the luminance point information includes at least:
  (i) a first luminance value indicating a peak luminance of the image data;
  (ii) a second luminance value indicating a diffuse white luminance of the image data serving as a reference in the image data; and
  (iii) a third luminance value indicating a luminance of interest corresponding to a central object or an object of interest in the image data,
wherein each of the first luminance value, the second luminance value and the third luminance value is a dynamic value that varies from image to image or from scene to scene; and
if the first luminance value of the image data exceeds the peak luminance of a dynamic range of a display, compressing luminance values of the image data above the second luminance value using the luminance point information;
if the first luminance value of the image data is less than the peak luminance of dynamic range of the display, extending the dynamic range of the image data so that the image data is adapted to the dynamic range for the display,
wherein if the third luminance value of the image data is within the dynamic range for the display, luminance values of the image data at or below the third luminance value are maintained independent of whether the first luminance value of the image data is within the dynamic range for the display.

* * * * *